United States Patent
Kudo

(10) Patent No.: US 7,755,251 B2
(45) Date of Patent: Jul. 13, 2010

(54) CONTROL APPARATUS AND CONTROL METHOD FOR VIBRATION WAVE DRIVEN APPARATUS

(75) Inventor: Shinya Kudo, Kawasaki (JP)

(73) Assignee: Canon Kabushiki Kaisha (JP)

( * ) Notice: Subject to any disclaimer, the term of this patent is extended or adjusted under 35 U.S.C. 154(b) by 0 days.

(21) Appl. No.: 12/208,059

(22) Filed: Sep. 10, 2008

(65) Prior Publication Data

US 2009/0066187 A1    Mar. 12, 2009

(30) Foreign Application Priority Data

Sep. 12, 2007 (JP) ............... 2007-236502
Aug. 11, 2008 (JP) ............... 2008-206985

(51) Int. Cl.
*H02N 2/00* (2006.01)
*H01L 41/09* (2006.01)

(52) U.S. Cl. .................. 310/317; 310/316.01

(58) Field of Classification Search ........... 310/316.01, 310/317
See application file for complete search history.

(56) References Cited

U.S. PATENT DOCUMENTS

2004/0256951 A1 * 12/2004 Fujimoto et al. ............ 310/317

FOREIGN PATENT DOCUMENTS

| JP | 10-210775 A | | 8/1998 |
|---|---|---|---|
| JP | 2005-185085 | * | 7/2005 |

* cited by examiner

*Primary Examiner*—Thomas M Dougherty
(74) *Attorney, Agent, or Firm*—Rossi, Kimms & McDowell LLP

(57) ABSTRACT

A vibration wave driven apparatus capable of preventing a resonance frequency of a vibrator from being shifted to a frequency side higher than a fixed drive frequency of the vibrator during the execution of phase difference control or voltage control. Driving signals are supplied from a control apparatus to a vibration-type actuator having a piezoelectric element that functions as an electro-mechanical energy conversion element. To control the drive of the vibration-type actuator, either a phase difference between the driving signals or a voltage of the driving signals is changed. When either the phase difference or the driving signal voltage is changed, the frequency of the driving signals is set to a predetermined frequency higher than the frequency for use when neither the phase difference nor the driving signal voltage is changed.

10 Claims, 21 Drawing Sheets

CONTROL APPARATUS AND CONTROL METHOD FOR VIBRATION WAVE DRIVEN APPARATUS

BACKGROUND OF THE INVENTION

1. Field of the Invention

The present invention relates to a control apparatus and a control method for a vibration wave driven apparatus such as a vibration-type actuator.

2. Description of the Related Art

Heretofore, as disclosed in Japanese Laid-open Patent Publication No. 10-210775, there have been various proposals for a vibration-type actuator that produces an oval motion of predetermined mass to thereby drive a driven body. To this end, a construction such as for example shown in FIG. 15 is known.

FIG. 15 shows in external perspective view an example of the basic construction of a prior art vibration-type actuator.

As shown in FIG. 15, the vibration-type actuator has a vibrator that includes an elastic body 4 made of a metal material and formed into a shape of a rectangular plate. A piezoelectric element (electro-mechanical energy conversion element) 5 is joined to a rear surface of the elastic body 4, and a plurality of protrusions 6 are provided at predetermined positions on an upper surface of the elastic body 4.

With this construction, AC voltages are applied to the piezoelectric element 5 to simultaneously produce both a second-order bending vibration in a long-side direction of the elastic body 4 and a first-order bending vibration in a short-side direction of the elastic body 4, whereby an oval motion of the protrusions 6 is excited. The oval motion of the protrusions 6 is able to rectilinearly move a driven body 7, if the driven body 7 is made in pressure contact with the protrusions 6. The protrusions 6 therefore function as a driving section of the vibrator.

FIG. 16 schematically shows an example of polarization regions on the piezoelectric element 5 of the vibration-type actuator in FIG. 15. FIGS. 17A and 17B show in perspective view vibration modes of the elastic body 4. FIG. 18 is for explaining an oval motion excited in the protrusions 6 of the elastic body 4.

As shown in FIG. 16, the piezoelectric element 5 is polarization-processed and has two electrodes A1, A2. When in-phase AC voltages V1, V2 are applied to the two electrodes A1, A2, a first-order bending vibration having two nodes each extending in a direction parallel to the long-side direction is excited in the rectangular elastic body 4. This first-order bending vibration corresponds to a first vibration mode shown in FIG. 17A.

When reverse-phase AC voltages V1, V2 are applied to the two electrodes A1, A2, a second-order bending vibration having three nodes each extending parallel to the short-side direction of the rectangular elastic body 4 is excited, which corresponds to a second vibration mode shown in FIG. 17B.

By a combination of the first and second vibration modes, an oval motion is excited in the protrusions 6. The driven body 7 if made in pressure-contact with the protrusions 6 can rectilinearly be driven.

In the first vibration mode shown in FIG. 17A, a vibration of the protrusions 6 is excited such that the amplitude (hereinafter referred to as the Z-axis amplitude) of vibration varies in a direction perpendicular to the surfaces of the protrusions 6 with which the driven body 7 is made in pressure contact. In the second vibration mode shown in FIG. 17B, a vibration of the protrusions 6 is excited such that the amplitude (herein-after referred to as the X-axis amplitude) of vibration varies in a direction parallel to the direction in which the driven body 7 is driven.

A combination of the first and second two vibration modes is able to excite an oval motion in the protrusions 6, as shown in FIG. 18. A ratio of the Z- and X-axis amplitudes represents an oval ratio of the oval motion.

FIG. 19 shows respective changes in the amplitude of vibration of the protrusions 6 in the first and second vibration modes, which are observed when the phase difference between the two-phase voltages V1, V2 is changed in a range from −180 degrees to 180 degrees.

When the phase difference between the two-phase AC voltages V1, V2 applied to the two electrodes A1, A2 of the polarized piezoelectric element 5 varies from −180degrees to 180 degrees, the amplitude of vibration of the protrusions 6 varies as shown by curves P1, P2 in FIG. 19 in the first and second vibration modes. In FIG. 19, the phase difference is taken along the abscissa, and the amplitude of vibration in the first and second vibration modes is taken along the ordinate.

The oval ratio of the oval motion excited in the protrusions 6 by a combination of the first and second vibration modes can be adjusted by changing the phase difference between the AC voltages V1, V2. In a lower part of FIG. 19, there are shown oval shapes corresponding to phase differences shown below the abscissa therealong.

By changing the phase difference between the AC voltages V1, V2 such that the sign of the phase difference is changed between plus (+) and minus (−), it is possible to change the direction toward which the driven body 7 is rectilinearly driven by the vibration-type actuator. In addition, the driving direction and the driving speed of the actuator can continuously be changed by continuously changing the phase difference, including the plus/minus sign, from an arbitrary value (for example, by continuously changing the phase difference, including the plus/minus sign, from 90 degrees to −90 degrees).

As generally known, the driving speed can be made faster by setting the frequency of the AC voltages applied to the piezoelectric element to a value closer to a resonance frequency of the vibrator, and the driving seed can be made slower by setting the frequency of the AC voltages to a value more far away from the resonance frequency of the vibrator.

A relation between drive frequency and driving speed in the vibration-type actuator having the basic construction shown in FIG. 15 is represented as shown for example in FIG. 20. Specifically, the actuator has a characteristic that the driving speed has a peak value at a resonance frequency of the vibrator, gradually decreases on a frequency side higher than the resonance frequency, and sharply decreases on a frequency side lower than the resonance frequency.

As described above, with the vibration-type actuator having the piezoelectric element 5 polarization-processed as shown in FIG. 16, speed control (frequency control) can be carried out by changing the frequency of the two AC voltages V1, V2 applied to the piezoelectric element 5. Speed control (phase difference control) can also be carried out by changing the phase of the AC voltages V1, V2.

Next, another example of polarization regions in the piezoelectric element 5 of the vibration-type actuator shown in FIG. 15 will be described.

FIG. 21 schematically shows another example of polarization regions of the piezoelectric element 5 of the vibration-type actuator in FIG. 15.

As shown in FIG. 21, the piezoelectric element 5 in this example is polarization-processed and has electrodes A1, A2. The electrodes A1 include piezoelectric regions which are polarization-processed to the "plus (+)" polarity and piezoelectric regions which are polarization-processed to the "minus (−)" polarity.

When the AC voltage V2 is applied to the electrode A2, which is in the piezoelectric region shown in FIG. 21, a first-order bending vibration is excited that corresponds to the first vibration mode shown in FIG. 17A. When the AC voltage V1 is applied to the electrodes A1 in the piezoelectric regions shown in FIG. 21, a second-order bending vibration is excited that corresponds to the second vibration mode shown in FIG. 17B.

With use of the AC voltages V1, V2 of the same frequency but 90 degrees shifted in phase to each other, an oval motion of the protrusions 6 is generated. Thus, it is possible to rectilinearly drive the driven body 7, which is made in pressure contact with the protrusions 6.

The magnitude of the Z-axis amplitude in FIG. 17A can be adjusted by adjusting the amplitude of the AC voltage V2 applied to the electrode A2, and the magnitude of the X-axis amplitude in FIG. 17B can be adjusted by adjusting the amplitude of the AC voltage V1 applied to the electrodes A1. The magnitudes of the X- and Z-axis amplitudes can be adjusted by adjusting a duty ratio of the AC voltages V1, V2 applied to the electrodes A1, A2 by using a digital circuit or a logic circuit.

The moving speed of the driven body 7 can be made faster by increasing the X-axis amplitude (shown in FIG. 18) of the oval motion excited in the protrusions 6, and the moving speed of the driven body 7 can be made slower by decreasing the X-axis amplitude of the oval motion. By variably changing the amplitude of the voltage V1 applied to the electrodes A1 in this manner, the X-axis amplitude of the oval motion can be changed, as shown in FIGS. 22A and 22B, whereby the speed control can be carried out.

With the vibration-type actuator having the piezoelectric element 5 polarization-processed as shown in FIG. 21, the speed control (frequency control or voltage control) can be achieved by changing the frequency or the amplitude of the two AC voltages V1, V2 applied to the piezoelectric element 5, as described above.

By combining the frequency control, the phase difference control, and the voltage control, it is therefore possible to carry out the position control for the vibration-type actuator.

Heretofore, to satisfy both the positioning accuracy and the dynamic range of the position control in driving the vibration-type actuator, a combination of frequency control and phase difference control or a combination of frequency control and voltage control has been proposed. The frequency control is not high in positioning accuracy but excellent in dynamic range. On the other hand, the phase difference control and the voltage control do not have a wide dynamic range but excellent in positioning accuracy. In view of this, it has been proposed to carry out the frequency control for rapid and rough position control and then carry out the phase difference control or the voltage control for accurate positioning.

The present inventors found that the resonance frequency increases with the decrease in amplitude of oval motion in a direction in which the driven body is moved. This is because the elastic body of the vibrator has a nonlinear characteristic with respect to the rigidity. The rigidity of the elastic body changes with the change in amplitude of displacement, resulting in a change in the resonance frequency of the vibrator. Therefore, even when the drive frequency is kept unchanged, the driving speed rapidly decreases (hereinafter referred to as the "rapid deceleration phenomenon"), if the drive frequency decreases to a value lower than the resonance frequency due to a change in phase difference between driving signals or due to a change in the driving signal voltage. Thus, there occurs a dead zone even in the phase difference control or the voltage control, which are high in positioning accuracy.

FIG. 23 shows in graph a relation between drive frequency, driving speed, and phase difference between two-phase voltages applied to the piezoelectric element (i.e., a relation between the phase difference and the resonance frequency of a vibrator). As shown for example in FIG. 23, the more deviated from 90 degrees the phase difference between the voltages V1, V2 applied to the electrodes A1, A2 of the piezoelectric element 5 in FIG. 16, the smaller the amplitude of vibration in the second vibration mode will be and the higher the resonance frequency of the vibrator in the second vibration mode will be. If the drive frequency is set to the resonance frequency at the phase difference of 60 degrees in a state that the phase difference is set at 90 degrees, the drive frequency is at a value higher in frequency than the resonance frequency at the phase difference of 90 degrees, and therefore the rapid deceleration phenomenon does not occur. However, if the phase difference is shifted to a value smaller than 60 degrees, with the drive frequency kept unchanged at the resonance frequency at the phase difference of 60 degrees, the drive frequency becomes lower than the resonance frequency at the phase difference of less than 60 degrees, and the rapid deceleration phenomenon suddenly occurs.

The following is a description of another example. FIG. 24 shows in graph a relation between the duty ratio of AC voltages applied to the piezoelectric element and the resonance frequency of a vibrator. As shown in FIG. 24, the smaller the amplitude (duty ratio) of the voltage V1 applied to the electrode A1 of the piezoelectric element 5 in FIG. 21, the smaller the amplitude of vibration (driving speed) in the second vibration mode and the higher the resonance frequency of the vibrator in the second vibration mode will be. If the drive frequency is set to the resonance frequency at the duty ratio of 30% in a state that the duty ratio is set at 50%, the drive frequency is at a value higher in frequency than the resonance frequency at the duty ratio of 50%, and therefore the rapid deceleration phenomenon does not occur. However, if the duty ratio is shifted to a value smaller than 30%, with the drive frequency kept unchanged at the resonance frequency at the duty ratio of 50%, the resonance frequency at the duty ratio of less than 30% is shifted to the side higher than the fixed drive frequency, and the rapid deceleration phenomenon suddenly occurs.

As described above, the rapid deceleration phenomenon causing a sudden decrease in the driving speed can occur due to a shift of the resonance frequency to a frequency higher than the fixed drive frequency during the execution of the phase difference control or the voltage control, which are high in positioning accuracy. This results in a possibility that a dead zone is caused in the control by the vibration wave driven apparatus.

SUMMARY OF THE INVENTION

The present invention provides the following control apparatuses and methods for a vibration wave driven apparatus.

According to a first aspect of this invention, there is provided a control apparatus for a vibration wave driven apparatus that applies driving signals to a vibrator including an electro-mechanical energy conversion element to thereby produce an oval motion of a driving section of the vibrator by which a driven body made in contact with the driving section is moved, comprising an operation amount determining unit adapted to determine an operation amount of the vibrator, a frequency determining unit adapted to determine a frequency of the driving signals based on the operation amount, and an oval ratio determining unit adapted to determine an oval ratio of the oval motion by changing a phase difference between the driving signals based on the operation amount, wherein the frequency determining unit sets the frequency of the driving signals to a frequency upper limit value when the phase difference between the driving signals is changed by the oval ratio determining unit, and sets the frequency of driving signals to a frequency lower than the frequency upper limit value when the phase difference between the driving signals is not changed by the oval ratio determining unit.

According to a second aspect of this invention, there is provided a control apparatus for a vibration wave driven apparatus that applies driving signals to a vibrator including an electromechanical energy conversion element to thereby produce an oval motion of a driving section of the vibrator by which a driven body made in contact with the driving section is moved, comprising an operation amount determining unit adapted to determine an operation amount of the vibrator, a frequency determining unit adapted to determine a frequency of the driving signals based on the operation amount, and an oval ratio determining unit adapted to determine an oval ratio of the oval motion by changing a voltage of the driving signals based on the operation amount, wherein the frequency determining unit sets the frequency of the driving signals to a frequency upper limit value when the voltage of the driving signals is changed by the oval ratio determining unit, and sets the frequency of the driving signals to a frequency lower than the frequency upper limit value when the voltage of the driving signals is not changed by the oval ratio determining unit.

According to a third aspect of this invention, there is provided a control method for a vibration wave driven apparatus that applies driving signals to a vibrator including an electro-mechanical energy conversion element to thereby produce an oval motion of a driving section of the vibrator by which a driven body made in contact with the driving section is moved, comprising an operation amount determining step of determining an operation amount of the vibrator, a frequency determining step of determining a frequency of the driving signals based on the operation amount determined in the operation amount determining step, and an oval ratio determining step of determining an oval ratio of the oval motion by changing a phase difference between the driving signals based on the operation amount determined in the operation amount determining step, wherein the frequency of the driving signals is set to a frequency upper limit value in the frequency determining step when the phase difference between the driving signals is changed in the oval ratio determining step, and the frequency of driving signals is set to a frequency lower than the frequency upper limit value when the phase difference between the driving signals is not changed in the oval ratio determining step.

According to a fourth aspect of this invention, there is provided a control method for a vibration wave driven apparatus that applies driving signals to a vibrator including an electro-mechanical energy conversion element to thereby produce an oval motion of a driving section of the vibrator by which a driven body made in contact with the driving section is moved, comprising an operation amount determining step of determining an operation amount of the vibrator, a frequency determining step of determining a frequency of the driving signals based on the operation amount determined in the operation amount determining step, and an oval ratio determining step of determining an oval ratio of the oval motion by changing a voltage of the driving signals based on the operation amount determined in the operation amount determining step, wherein the frequency of the driving signals is set to a frequency upper limit value in the frequency determining step when the voltage of the driving signals is changed in the oval ratio determining step, and the frequency of the driving signal is set to a frequency lower than the frequency upper limit value in the frequency determining step when the voltage of the driving signals is not changed in the oval ratio determining step.

DETAILED DESCRIPTION OF THE PREFERRED EMBODIMENTS

The present invention will now be described in detail below with reference to the drawings showing preferred embodiments thereof.

First Embodiment

In a first embodiment of this invention, a control apparatus will be described that controls a vibration-type actuator (vibration wave driven apparatus) by a combination of frequency control and phase difference control.

(Construction of the Control Apparatus of the First Embodiment)

Figure 1:
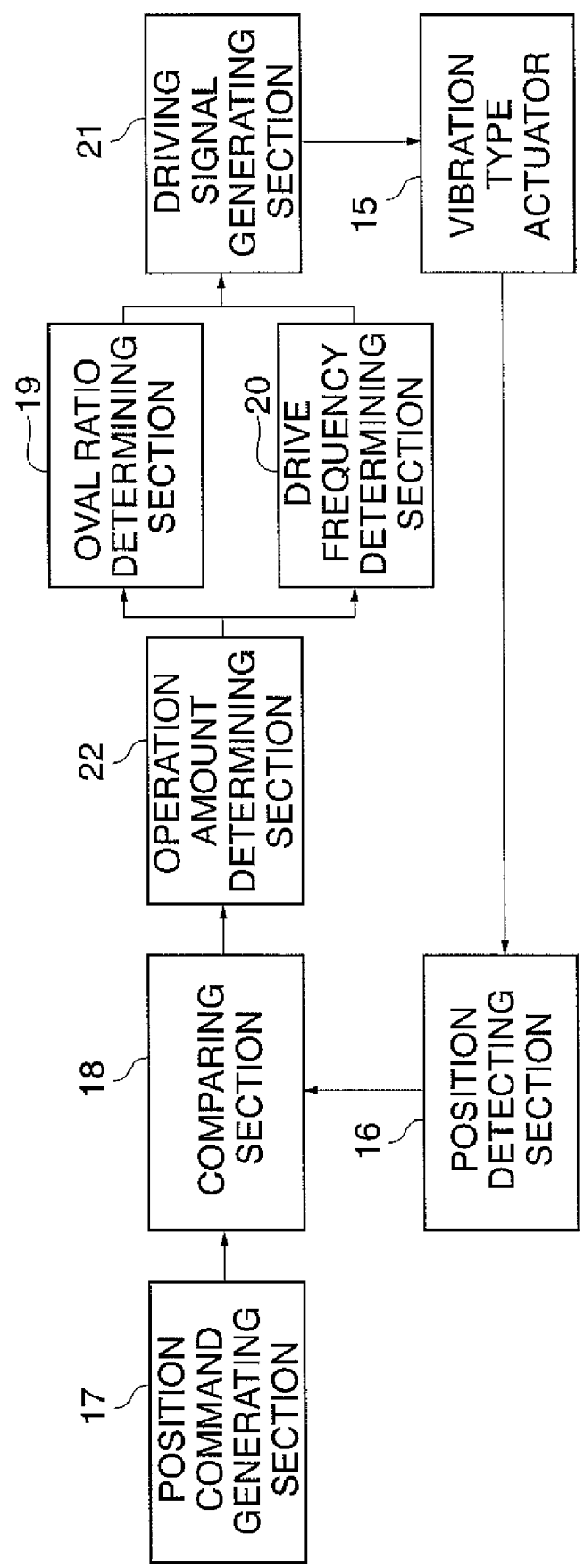
FIG. 1 is a block diagram showing the construction of a control apparatus of a vibration-type actuator according to a first embodiment.

FIG. 1 shows in block diagram the construction of the control apparatus for the vibration-type actuator according to the first embodiment of this invention.

The control apparatus includes a position command generating section 17 for generating a target value of a stop position of the driven body. The position command generating section 17 is connected at its output side with an operation amount determining section 22 via a comparing section 18. The comparing section 18 compares a target value, which is output from the position command generating section 17, with a current position of the driven body, which is output from a position detecting section 16. In accordance with a result of the comparison by the comparing section 18, the operation amount determining section 22 calculates a remaining operation amount "e" of the vibration-type actuator 15. The position detecting section 16 is for detecting the position of the driven body of the vibration-type actuator 15, and is implemented, for example, by a linear scale or an encoder. The vibration-type actuator 15 has the construction shown in FIG. 15. Specifically, the actuator 15 includes a vibrator having an elastic body 4 made of a metal material and formed into a rectangular plate shape, a piezoelectric element 5 joined to a rear surface of the elastic body 4, and a plurality of protrusions 6 provided as a driving section on an upper surface of the elastic body 4.

The operation amount determining section 22 is connected at its output side with an oval ratio determining section 19 and a drive frequency determining section 20, which are connected at their output side with a driving signal generating section 21. The driving signal generating section 21 receives outputs from the oval ratio determining section 19 and the drive frequency determining section 20, and generates AC voltages which are actually applied to the piezoelectric element 5 of the vibration-type actuator 15. In accordance with the output from the operation amount determining section 22, the oval ratio determining section 19 determines a ratio of X- and Z-axis amplitudes of an oval motion of protrusions 6 of the vibration-type actuator 15. In accordance with the output from the operation amount determining section 22, the drive frequency determining section 20 determines a drive frequency of the AC voltages applied to the vibration-type actuator 15. The driving signal generating section 21 receives outputs from the oval ratio determining section 19 and the drive frequency determining section 20, and generates the AC voltages applied to the piezoelectric element 5 of the vibration-type actuator 15.

In this embodiment, the above described oval ratio determining section 19, the drive frequency determining section 20, and the driving signal generating section 21 are implemented by software running on a CPU. The driving signal generating section 21 is implemented by a function generator comprised of a logic circuit, which is primarily comprised of a counter. The operation amount determining section 22 is implemented by a PI controller or a PID controller.

In accordance with the output from the drive frequency determining section 20, the logic circuit of the driving signal generating section 21 generates a first periodic signal which is used as a reference for the drive frequency. In accordance with the output from the oval ratio determining section 19, the logic circuit generates a second periodic signal of the same frequency as the first periodic signal but having a phase difference relative to the first periodic signal.

The first and second periodic signals generated by the driving signal generating section 21 are amplified by a power amplifier and supplied as driving signals to the piezoelectric element 5 of the vibration-type actuator 15. The power amplifier that amplifies the first and second periodic signals may be comprised of a switching device or a voltage step-up circuit.

In this embodiment, the phase difference between the AC voltages V1, V2 applied to the piezoelectric element 5 (see FIG. 16) joined to the rear surface of the elastic body 4 of the vibration-type actuator 15 is controlled to thereby change the oval ratio of the oval motion of the protrusions 6.

Figure 16:
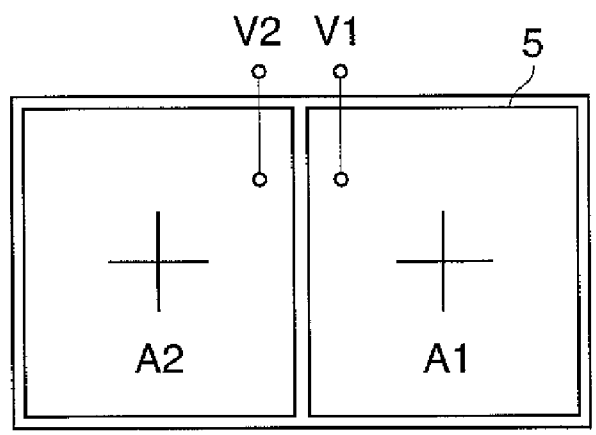
FIG. 16 is a view schematically showing an example of polarization regions on a piezoelectric element of the vibration-type actuator shown in FIG. 15.

Specifically, in the vibration-type actuator 15 having the piezoelectric element 5 on which two electrodes A1, A2 are polarized and disposed as shown in FIG. 16, the driven body is driven by the oval motion of the protrusions 6 generated by a combination of the first and second vibration modes, as described below.

In a case that the two-phase AC voltages V1, V2 applied to the two electrodes A1, A2 have the same amplitude and frequency but have a phase difference of 180 degrees from each other, the piezoelectric regions of the electrodes A1, A2 are elongated and contracted, respectively, at a given instant. As a result, the second vibration mode is excited.

In a case that the phase difference between the AC voltages V1, V2 is made equal to 0 degree, the piezoelectric regions of the electrodes A1, A2 are simultaneously elongated or contracted, and as a result, the first vibration mode is excited.

When the phase difference between the AC voltages V1, V2 is made equal to a value other than 0 degree, 180 degrees, and −180 degrees, the first and second vibration modes are simultaneously excited. In that case, a relation between the amplitude "A" of vibration of the projections 6 of the vibrator in the first vibration mode, the amplitude "B" thereof in the second vibration mode, and the phase difference "θ" between the AC voltages V1, V2 respectively applied to the electrodes A1, A2 is represented by the following expressions (1), (2).

$$A = |2 \times \cos((p-\theta)/2)| \quad (1)$$

$$B = |2 \times \cos(\theta/2)| \quad (2)$$

Figure 19:
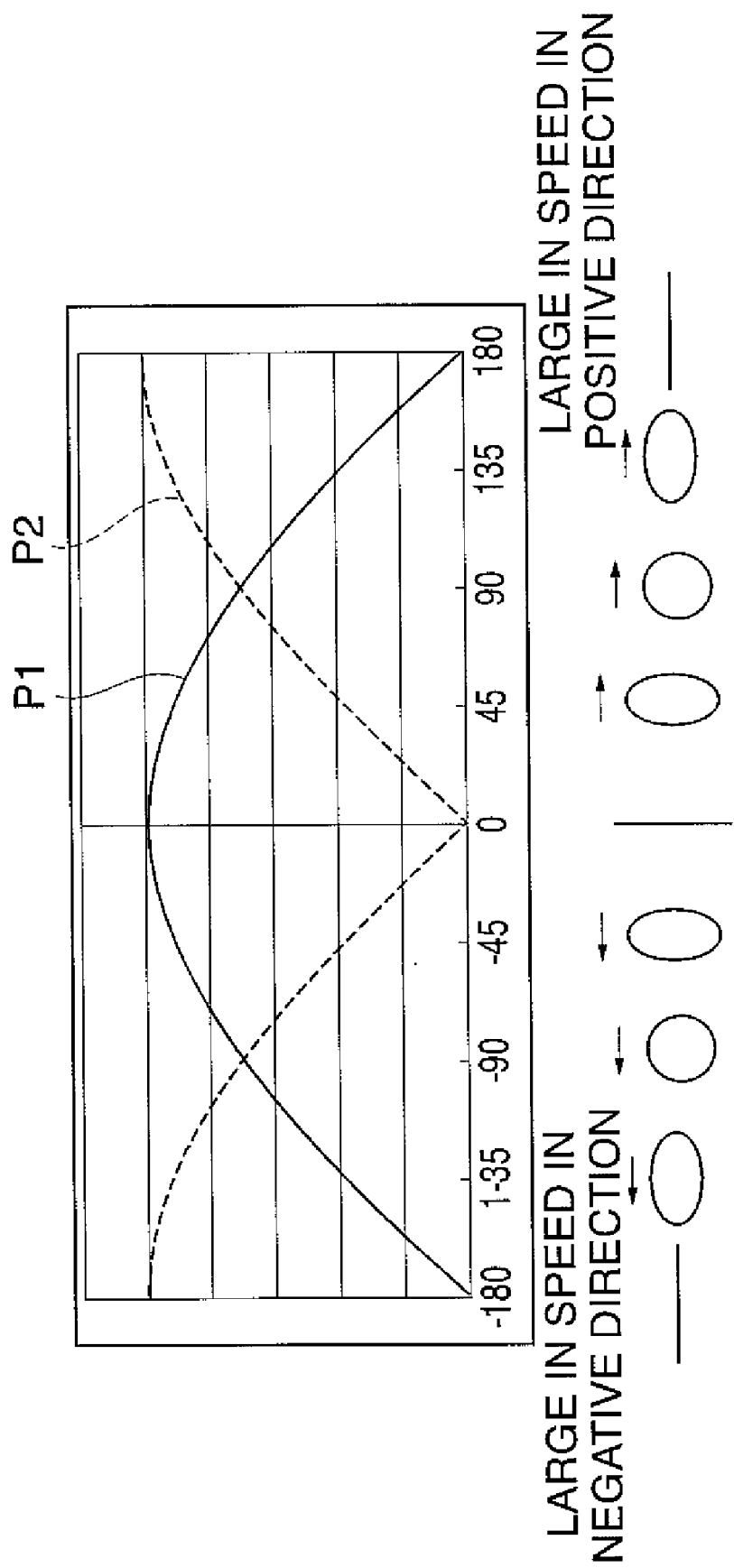
FIG. 19 is a graph for explaining amplitudes of vibration in the first and second vibration modes.
Figure 20:
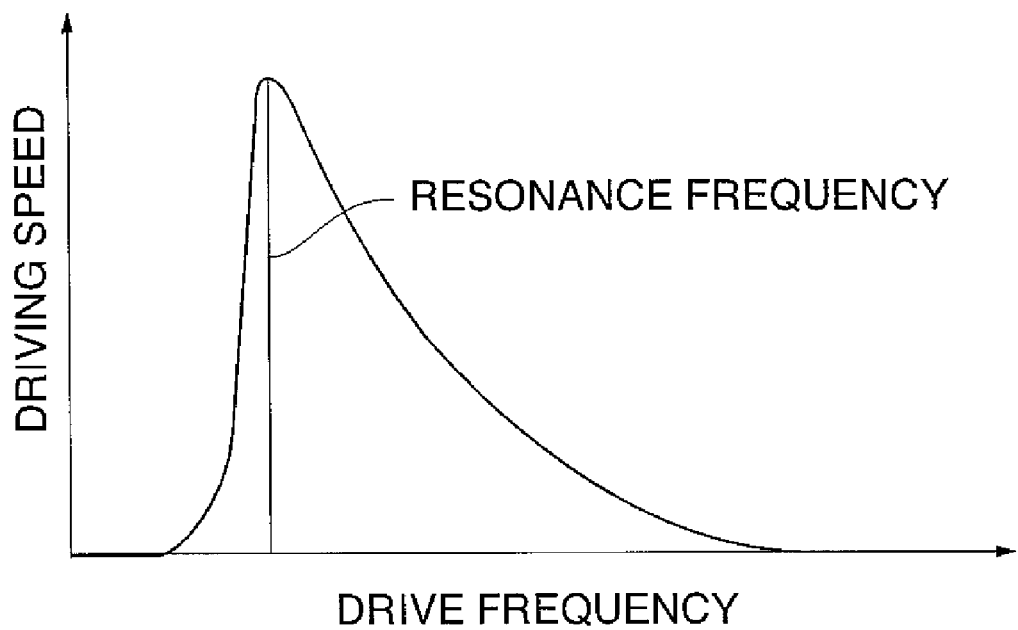
FIG. 20 is a graph showing a relation between drive frequency and driving speed in the vibration-type actuator.

FIG. 19 shows the amplitudes of vibration in the first and second vibration modes "P1", "P2" observed when the phase difference "θ" in expressions (1), (2) is varied from −180 degrees to 180 degrees. As previously described, oval shapes corresponding to phase differences "θ" taken along the abscissa are indicated in a lower part of FIG. 19. By changing the phase difference "θ" between the applied AC voltages V1, V2, the oval ratio of the oval motion of the protrusions 6 can be adjusted.

(Functions of the Oval Ratio Determining Section 19 and the Drive Frequency Determining Section 20)

Next, with reference to FIG. 2, the detailed functions of the oval ratio determining section 19 and the drive frequency determining section 20 will be described.

Figure 2:
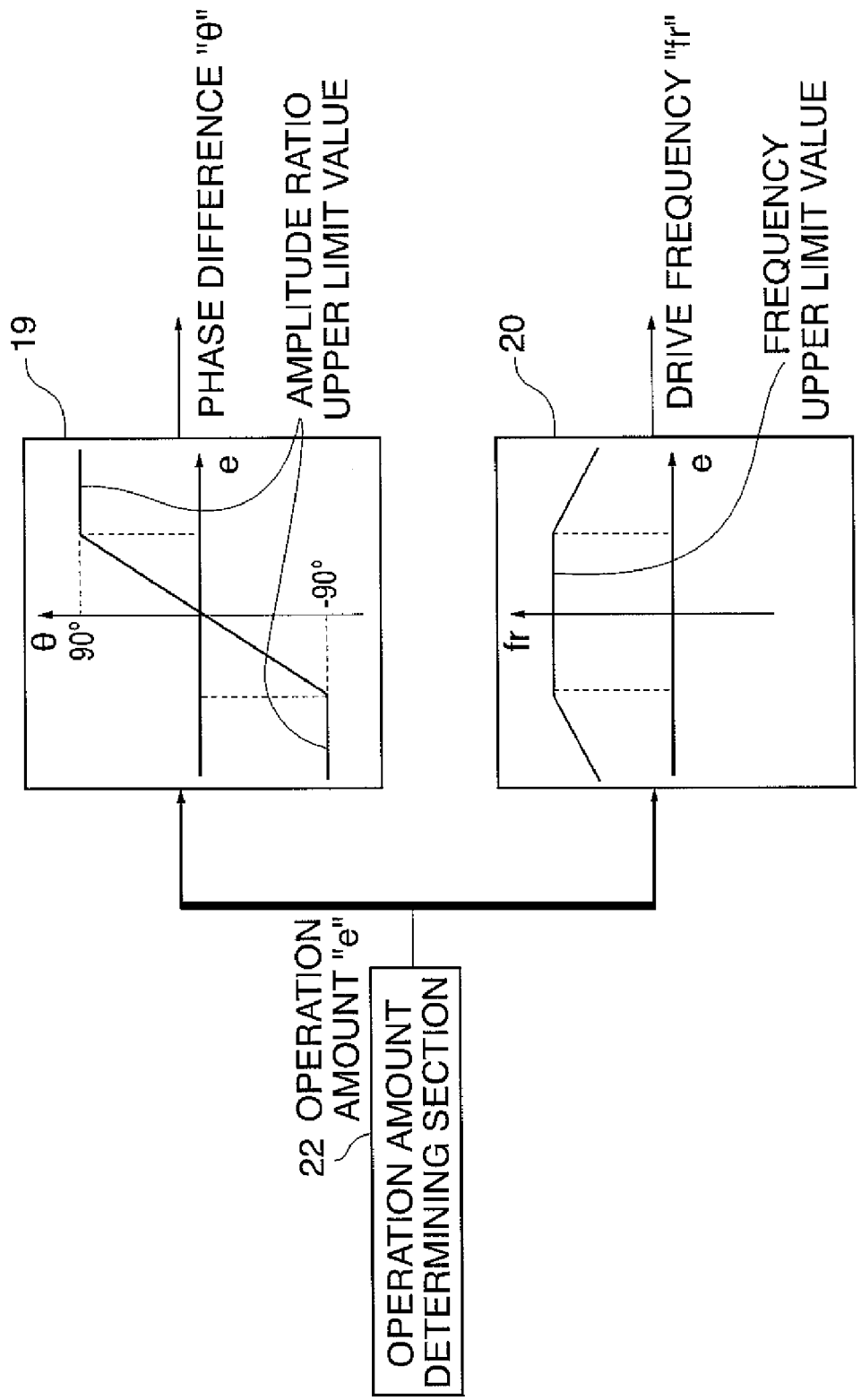
FIG. 2 is a view for explaining the functions of an oval ratio determining section and a drive frequency determining section of the first embodiment.

FIG. 2 shows the functions of the oval ratio determining section 19 and the drive frequency determining section 20 of the first embodiment.

In the graphs shown in FIG. 2, the operation amount "e" is taken along the abscissa, the phase difference "θ" and the drive frequency "fr" are taken along the ordinate. The operation amount "e" output from the operation amount determining section 22 is supplied, as an input value, to the oval ratio determining section 19. In accordance with the input value, the oval ratio determining section 19 reads a value stored in a memory, not shown, and determines the oval ratio. In accordance with the thus determined oval ratio, the drive frequency determining section 20 calculates a drive frequency "fr".

An output value determined by the oval ratio determining section 19 represents a phase difference "θ" between the AC voltages V1, V2 applied to the piezoelectric element 5. In the oval ratio determining section 19, as shown in FIG. 2, an upper limit threshold value of the phase difference "θ" (amplitude ratio) is set to 90 degrees, and a lower limit threshold value of the phase difference "θ" is set to −90 degrees for use when the driven body is driven in opposite direction.

The closer the phase difference "θ" to the upper or lower limit threshold value, the greater the amplitude of the oval motion of the protrusions 6 of the vibration-type actuator 15 in the moving direction of the driven body and the faster the moving speed of the driven body will be.

In this embodiment, if a value read out from the memory in accordance with the operation amount "e" supplied from the operation amount determining section 22 does not reach the upper or lower limit threshold value of the phase difference "θ" in FIG. 2, the drive frequency "fr" is set to the frequency upper limit value, and the phase difference "θ" is set in accordance with the readout value. On the other hand, if a value read out from the memory in accordance with the operation amount "e" supplied from the operation amount determining section 22 reaches the upper or lower limit threshold value of the phase difference "θ" in FIG. 2, the phase difference "θ" is set to the upper or lower limit threshold value, and a deficiency is output as a frequency command value.

The frequency upper limit value is set to a maximum possible frequency value or its vicinity in a frequency band for use when the vibration-type actuator is driven. Based on results of measurement in which the phase difference "θ" is variably set in a range from 90 degrees to −90 degrees, with the drive frequency "fr" set at the frequency upper limit value, the oval ratio determining section 19 determines in advance a value to be set, and stores the determined value into a memory, not shown.

As described above, to perform the phase difference control, the drive frequency is fixed at a maximum possible frequency value in the frequency band for use when the actuator is driven. In other words, the drive frequency for the frequency control is always set to a frequency lower than the drive frequency set for the phase difference control. This makes it possible to prevent the rapid deceleration phenomenon, even if the resonance frequency of the vibrator in the second vibration mode is shifted toward a higher frequency side due to the phase difference control.

(Control Operation in the First Embodiment)

Next, with reference to FIG. 3, a description will be given of a control operation according to the first embodiment.

Figure 3:
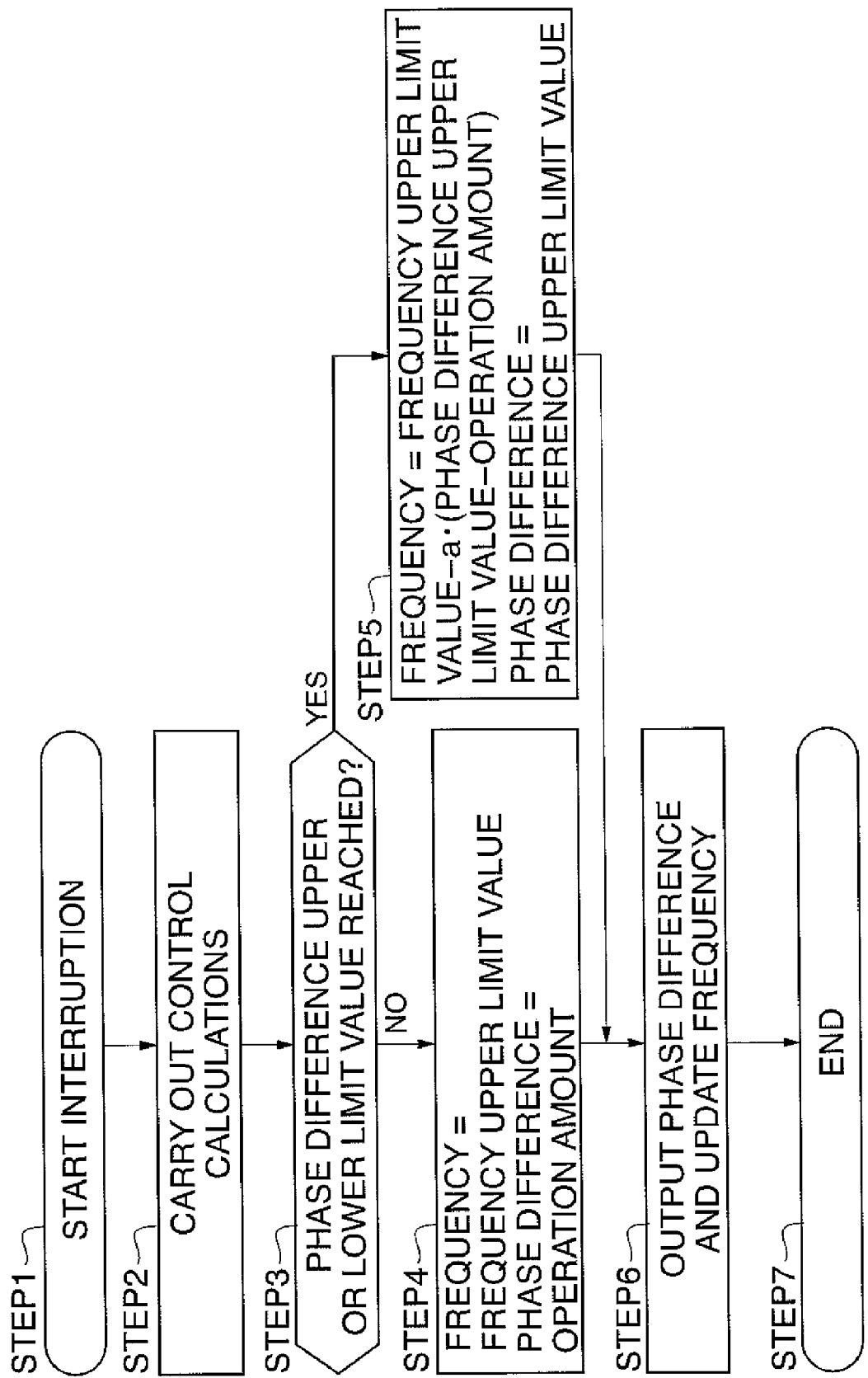
FIG. 3 is a flowchart showing a control operation in the first embodiment.

FIG. 3 shows in flowchart the control operation according to the first embodiment, which is implemented by the CPU to carry out the position control for the vibration-type actuator 15.

When an instruction to start the vibration-type actuator 15 is given by an external signal or issued in the CPU, a control start function is called in STEP 1. The control start function may be called by interruption processing or may be configured in a loop function.

In the next STEP 2, the comparing section 18 reads out a target position of the driven body of the vibration-type actuator from the position command generating section 17. The comparing section 18 compares the target position with a current position of the driven body output from the position detecting section 16, and outputs a difference therebetween to the operation amount determining section 22. In accordance with the output value from the comparing section 18, the operation amount determining section 22 carries out control calculations and outputs an operation amount "e".

In the next STEP 3, it is determined whether or not a value read out from a memory, not shown, by the oval ratio determining section 19 in accordance with the operation amount "e" generated in STEP 2 reaches 90 degrees or −90 degrees. If it is determined that the value reaches 90 degrees or −90 degrees, the process proceeds to STEP 5. On the other hand, if it is determined that the phase difference value read out by the oval ratio determining section 19 does not reach 90 degrees or −90 degrees, i.e., if the value is less than the threshold value, the process proceeds to STEP 4.

In STEP 4, the drive frequency determining section 20 fixes the drive frequency at the frequency upper limit value shown in FIG. 2, and the oval ratio determining section 19 reads a phase difference "θ" in accordance with the operation amount "e" and sets the thus read phase difference.

In STEP 5, the oval ratio determining section 19 fixes the phase difference "θ" to either the upper or lower limit threshold value according to the moving direction of the driven body. Then, the oval ratio determining section 19 fixes the phase difference "θ" to the phase difference upper limit value shown in FIG. 2, and the drive frequency determining section 20 reads a drive frequency "r" according to the operation amount "e" and sets the thus read drive frequency. If the operation amount lied is equal to or larger than the phase difference upper limit threshold value, the drive frequency determining section 20 changes the drive frequency "fr" to a value obtained by subtracting, from the frequency upper limit value, a value obtained by multiplying a difference between the operation amount "e" and the phase difference upper limit by a proportional constant "a", as shown in expression (3) given below. The proportional constant "a" is a constant for converting an amount of speed change corresponding to a change in phase difference into an amount of speed change corresponding to a change in frequency.

Drive frequency [Hz]=Frequency upper limit value [Hz]−$a$×(Phase difference upper limit value [degrees]−Operation amount [degrees]) (3)

In the next STEP 6, based on the phase difference "θ" and the drive frequency "fr" set by the oval ratio determining section 19 and the drive frequency determining section 20, the driving signal generating section 21 generates two-phase frequency signals of AC voltage.

In STEP 7, the control is completed. If the control start function is called by the interruption processing, the next interruption processing is waited. If the control start function is arranged in a loop function, STEP 1 is called.

(Advantages of the First Embodiment)

As described above, in this embodiment, the control apparatus supplies driving signals to the vibration-type actuator 15 having the piezoelectric element 5 which is an electromechanical energy conversion element, and changes the phase difference "θ" between the driving signals to thereby control the drive of the vibration-type actuator 15. At this time, when the phase difference "θ" between the driving signals is changed, the frequency of driving signal (drive frequency "fr") is fixed to a frequency higher than that for a case where the phase difference is not changed. As a result, during the execution of the phase difference control, it is possible to prevent the resonance frequency of the vibrator from being shifted by the phase difference control to a frequency higher than the drive frequency "fr".

Second Embodiment

In the first embodiment, the arrangement has been described by way of example, in which the vibration-type actuator is driven by a combination of frequency control and phase difference control. In a second embodiment, an arrangement will be described, in which the vibration-type actuator is driven by a combination of frequency control and voltage control.

(Construction of the Second Embodiment)

Figure 15:
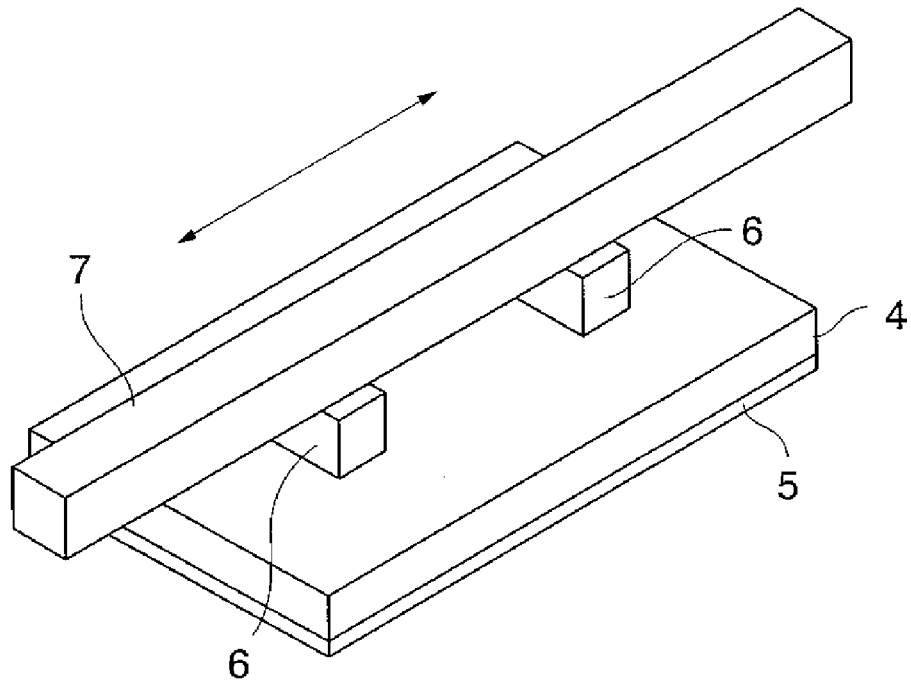
FIG. 15 is an external perspective view showing an example of the basic construction of a prior art vibration-type actuator.

As in the first embodiment, the construction of a control apparatus of this embodiment is such as shown in FIG. 1. The construction of a vibration-type actuator is such that the piezoelectric element 5 joined to the rear surface of the elastic body 4 in FIG. 15 is polarized as shown in FIG. 21.

In the drive control of the vibration-type actuator in this embodiment, a voltage ratio between the AC voltages V1, V2 applied to the piezoelectric element 5 is controlled so as to change the oval ratio of the oval motion of the protrusions 6.

Figure 17A:
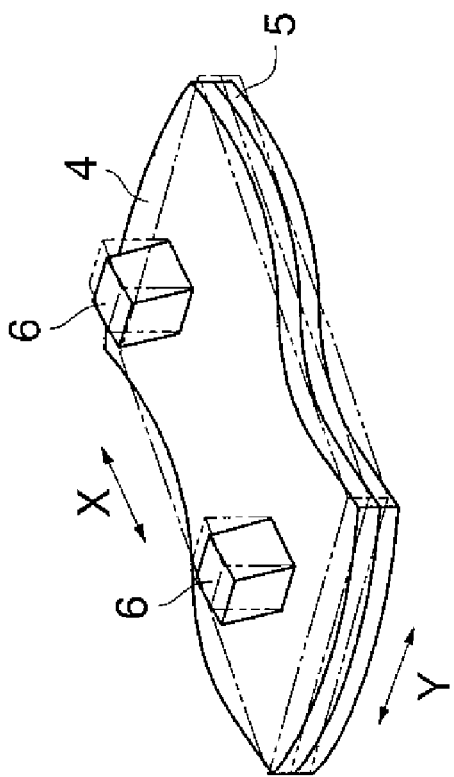
FIG. 17A is a perspective view showing a first vibration mode in which protrusions of an elastic body are vertically displaced relative to a driven body.
Figure 17B:
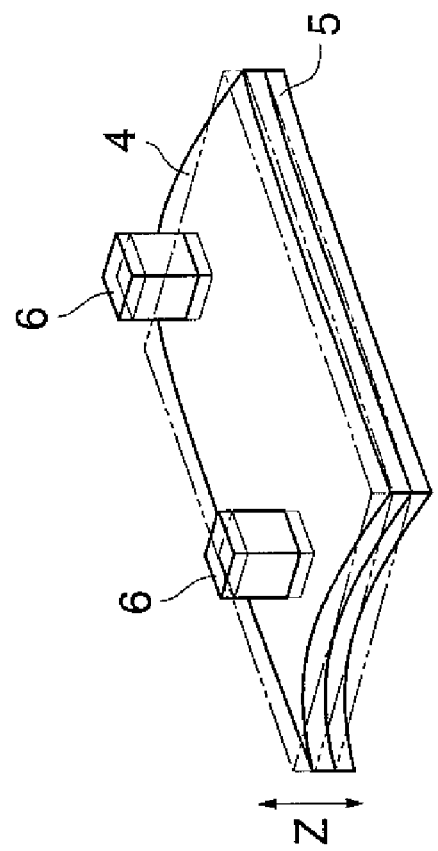
FIG. 17B is a perspective view showing a second vibration mode in which the protrusions are displaced parallel to the driven body.
Figure 18:
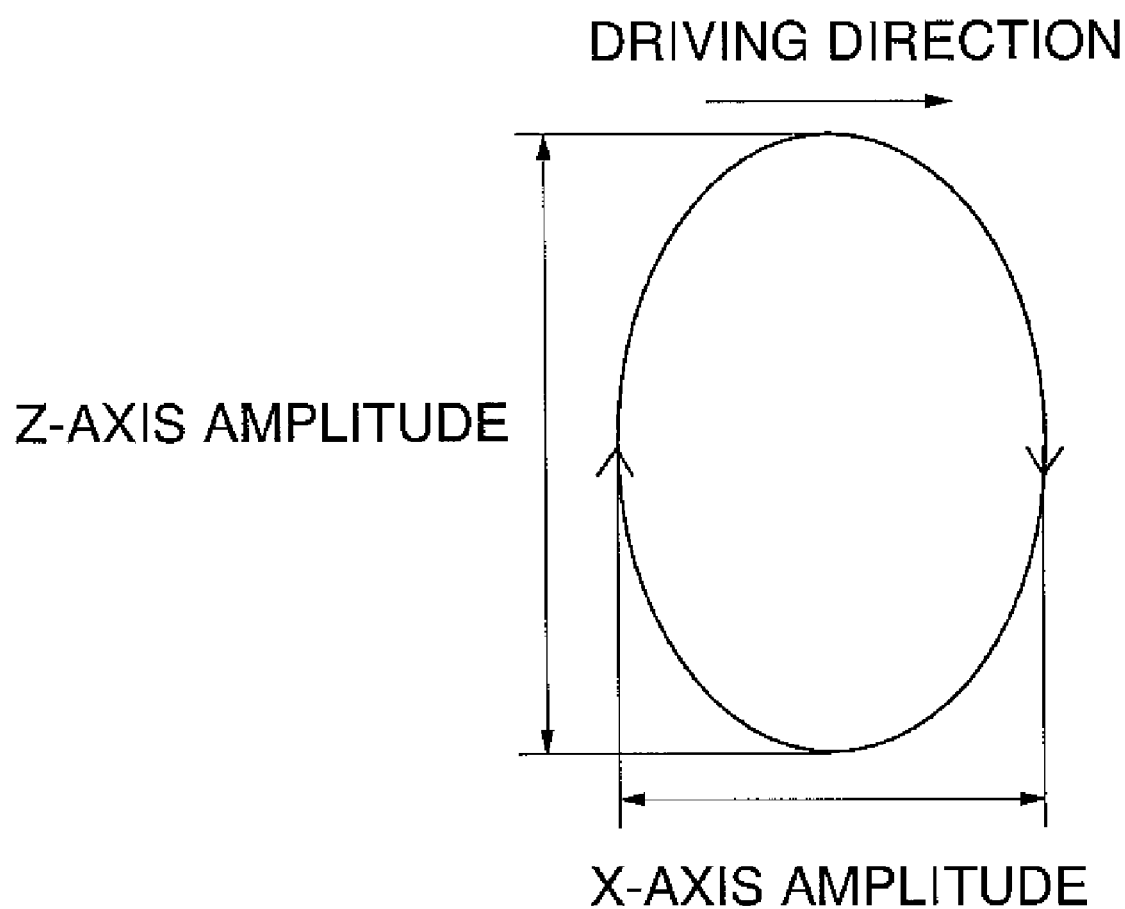
FIG. 18 is a view for explaining an oval motion excited in the protrusions of the elastic body.
Figure 21:
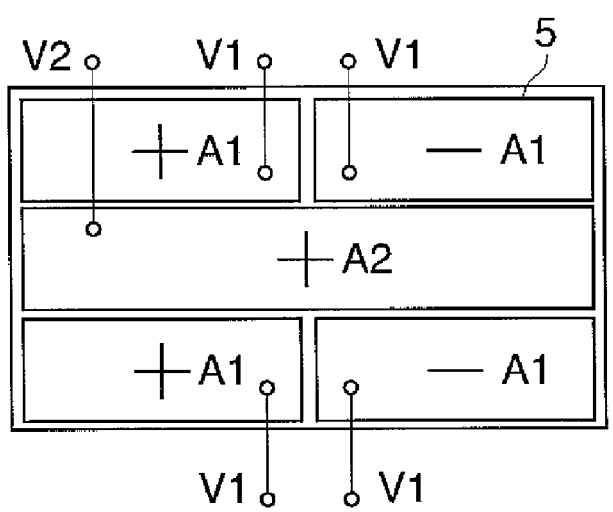
FIG. 21 is a view schematically showing another example of polarization regions on the piezoelectric element of the vibration-type actuator in FIG. 15.
Figure 22A:
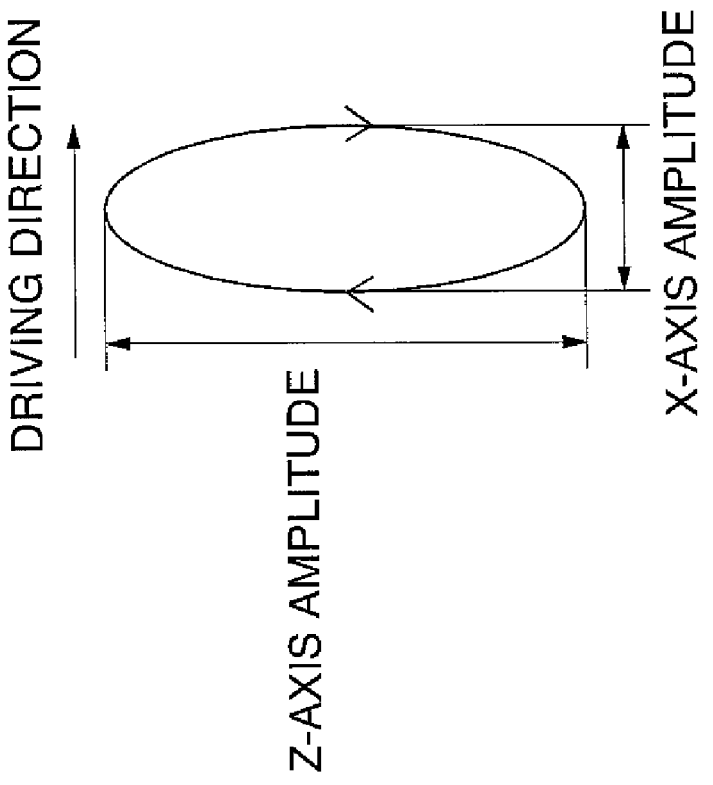
FIGS. 22A and 22B are views each for explaining an oval motion excited in the protrusions of the elastic body.
Figure 22B:
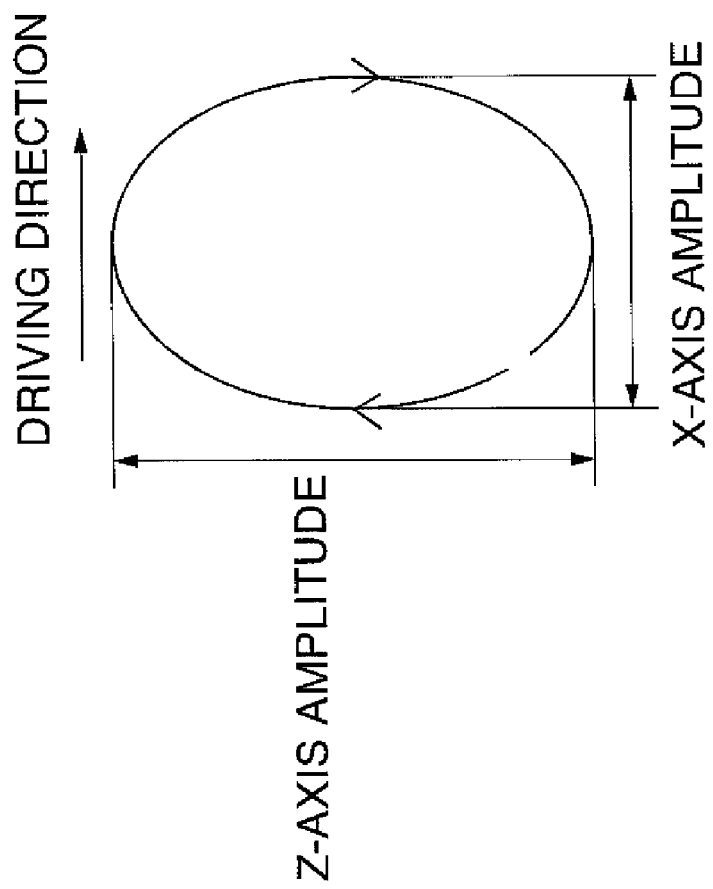

As described previously, the first vibration mode in FIG. 17A is excited by the application of the AC voltage V2 to the electrode A2 in FIG. 21, and the second vibration mode shown in FIG. 17B is excited by the application of the AC voltage V1 to the electrode A1. By combining the first and second two vibration modes, it is possible to excite the oval motion in the protrusions 6 as shown in FIG. 18.

Figure 4:
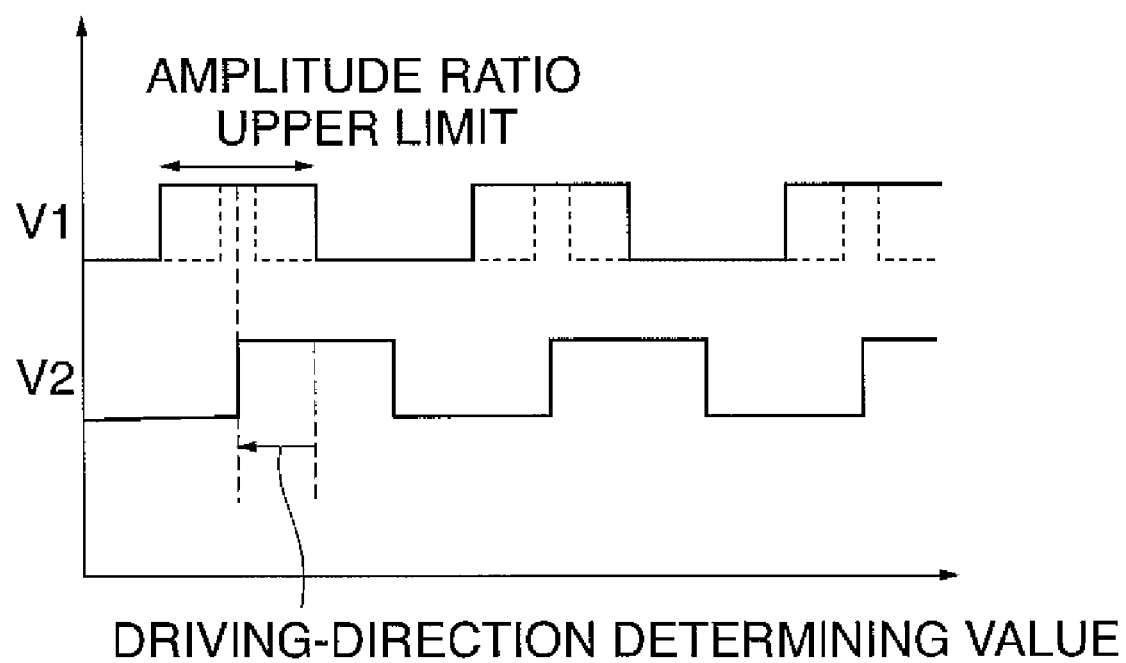
FIG. 4 is a view of waveforms of AC voltages applied to a piezoelectric element.

FIG. 4 shows in waveform diagram the AC voltages V1, V2 applied to the piezoelectric element 5. The amplitude ratio of the oval motion can be adjusted by inputting the AC voltage V1 of a duty ratio shown in FIG. 4 to the electrode A1 shown in FIG. 21.

(Functions of Oval Ratio Determining Section 19)

Next, the functions of the oval ratio determining section 19 of this embodiment will be described.

Figure 5:
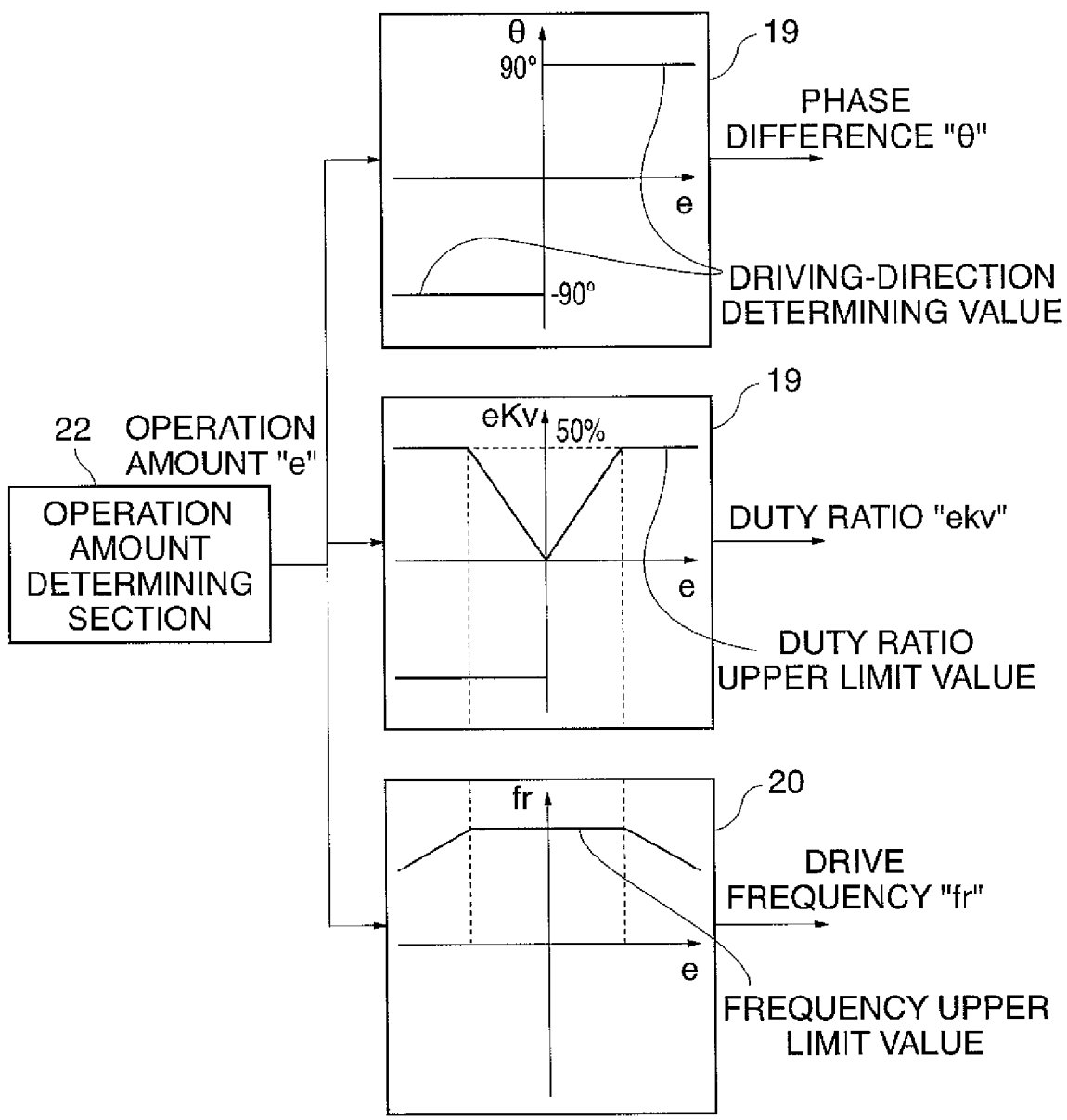
FIG. 5 is a view for explaining the function of an oval ratio determining section in a second embodiment.

FIG. 5 is for explaining the oval ratio determining section 19 of the second embodiment.

This embodiment differs from the first embodiment in the construction of the oval ratio determining section 19, which will be described in detail below.

In the graphs in FIG. 5, the operation amount "e" calculated by the operation amount determining section 22 is taken along the abscissa, and the phase difference "θ", the duty ratio "ekv", and the drive frequency "fr", which are shown in this order from above, are taken along the ordinate. The operation amount "e" output from the operation amount determining section 22 is supplied as an input value to the oval ratio determining section 19. In accordance with the input value, the oval ratio determining section 19 reads a value stored in a memory, not shown, and determines the oval ratio. In accordance with the determined oval ratio, the drive frequency determining section 20 calculates a drive frequency "fr".

The output values determined by the oval ratio determining section 19 include the phase difference "θ" between the AC voltages V1, V2 applied to the piezoelectric element 5, and the duty ratio "ekv" of the AC voltages V1, V2. Driving-direction determining values in the oval ratio determining section 19 indicated in FIG. 5 are values arbitrarily determined according to the sign of the input value and representing the phase difference "θ" between voltages V1, V2 applied to the two electrodes A1, A2. Specifically, in accordance with the moving direction of the driven body, either the phase difference "θ" between the voltages V1, V2 of 90 degrees or −90 degrees is selected.

As shown in FIG. 5, an upper limit threshold value of the duty ratio "ekv" (amplitude ratio) is set at 50% in the oval ratio determining section 19. The closer the duty ratio to the upper limit threshold value, the greater will be the amplitude of the oval motion of the protrusions 6 of the vibration-type actuator in the moving direction of the driven body, and the faster the moving speed of the driven body will be.

In this embodiment, if a value read out from a memory, not shown, in accordance with the operation amount "e" input from the operation amount determining section 22 does not reach the upper limit threshold value of the duty ratio "ekv" in FIG. 5, the drive frequency "fr" is set to the frequency upper limit value, and the read duty ratio is set. On the other hand, if the value read out from the memory in accordance with the operation amount "e" input from the operation amount determining section 22 reaches the upper limit threshold value of the duty ratio in FIG. 5, the phase difference "θ" is fixed at 50%, which is the upper limit threshold value, and a deficiency is output as a frequency command value.

As described above, to perform the voltage control, the drive frequency "fr" is fixed at the maximum possible frequency of the frequency band for use when the actuator is driven. In other words, the drive frequency "fr" for the execution of frequency control is always set to a frequency lower than the drive frequency set for the execution of the voltage control. This makes it possible to prevent the rapid deceleration phenomenon, even if the resonance frequency of the vibrator in the second vibration mode is shifted to a higher frequency side due to the voltage control.

(Control Apparatus of the Second Embodiment)

Next, with reference to FIG. 6, the control operation according to the second embodiment will be described.

Figure 6:
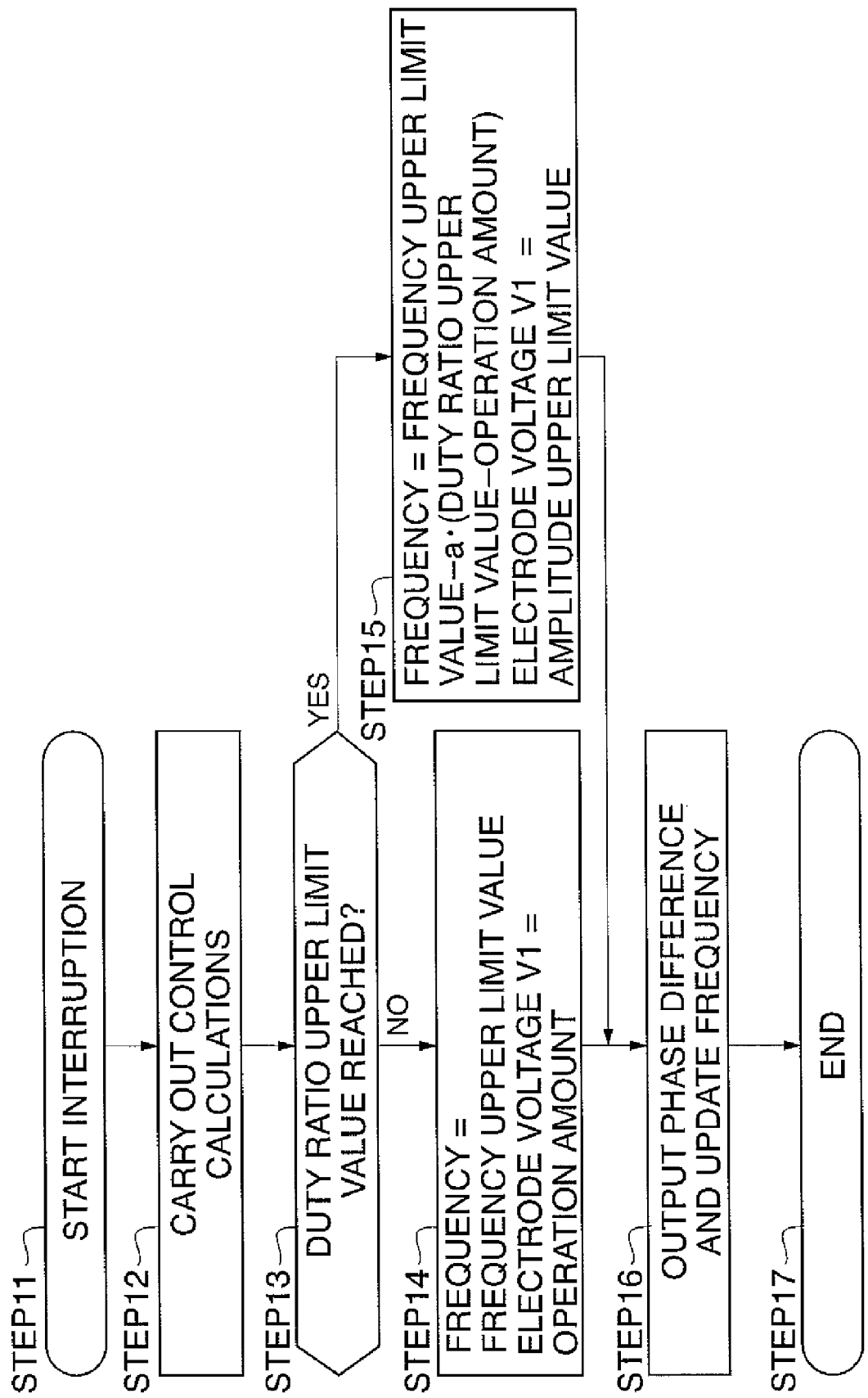
FIG. 6 is a flowchart showing a control operation in the second embodiment.

FIG. 6 shows in flowchart the control operation of the CPU for execution of the position control for the vibration-type actuator 15 of the second embodiment.

In STEP 11 and STEP 12 in this flowchart, the same processing is carried out as that in STEP 1 and STEP 2 in the flowchart of FIG. 3.

In the next STEP 13, if it is determined that a value of the duty ratio "ekv" read out from a memory, not shown, by the oval ratio determining section 19 in accordance with the operation amount "e" generated in STEP 12 reaches the upper limit threshold value, the flow proceeds to STEP 15. On the other hand, if the value of the duty ratio "ekv" read by the oval ratio determining section 19 does not reach the upper limit threshold value, i.e., if the value is less than the threshold value, the flow proceeds to STEP 14.

In STEP 14, the drive frequency determining section 20 fixes the drive frequency "fr" to the frequency upper limit value shown in FIG. 5, and the oval ratio determining section 19 sets a phase difference "θ" determined according to the moving direction of the driven body, reads a duty ratio "ekv" in accordance with the operation amount "e" and sets the read duty ratio "ekv".

In STEP 15, the oval ratio determining section 19 sets a phase difference "θ" determined according to the moving direction of the driven body, and fixes a duty ratio "ekv" to the upper limit threshold value. The oval ratio determining section 19 fixes the duty ratio to an upper value of the duty ratio shown in FIG. 5. The drive frequency determining section 20 reads a drive frequency "fr" in accordance with the operation amount "e" and sets the read drive frequency "fr".

If the operation amount "e" is equal to or larger than the duty ratio upper limit threshold value, the drive frequency determining section 20 changes the drive frequency "fr" to a value obtained by subtracting, from the frequency upper limit value, a value that is obtained by multiplying a difference between the operation amount "e" and the duty ratio upper limit by a proportional constant "a", as shown in expression (4) given below.

The proportional constant "a" is a coefficient for converting an amount of speed change corresponding to a change in duty ratio "ekv" into an amount of speed change corresponding to a change in frequency.

Drive frequency [Hz]=Frequency upper limit value

[Hz]−$a$×(Duty ratio upper limit value [degrees]−Operation amount [degrees])　　　(4)

In the next STEP 16, the driving signal generating section 21 generates two-phase frequency signals of AC voltage based on the phase difference "θ", the duty ratio "ekv", and the drive frequency "fr", which are set by the oval ratio determining section 19 and the drive frequency determining section 20.

In STEP 17, the control is completed. If the control start function is called by the interruption processing, the next interruption processing is waited. If the control start function is arranged in a loop function, STEP 11 is called.

(Advantages of the Second Embodiment)

As described above, in this embodiment, the control apparatus supplies driving signals to the vibration-type actuator 15 having the piezoelectric element 5, which is an electro-mechanical energy conversion element, and changes the voltage of the driving signals to thereby control the drive of the vibration-type actuator 15. When the driving signal voltage is changed, the frequency of the driving signals (drive frequency "fr") is fixed to a frequency higher than that for a case where the driving signal voltage is not changed. As a result, during the execution of the voltage control, it is possible to prevent the resonance frequency of the vibrator from being shifted by the voltage control to the frequency side higher than the drive frequency "fr".

Third Embodiment

In the first embodiment, the exemplar arrangement has been described in which the vibration-type actuator is driven by a combination of the frequency control and the phase difference control.

In the third embodiment, a description will be given of an arrangement for driving a vibration-type actuator by frequency control and phase difference control and by taking into consideration a variation caused by individual differences between vibration-type actuators and a variation in characteristic due to a change in environmental temperature.

(Construction of the Control Apparatus of the Third Embodiment)

Figure 7:
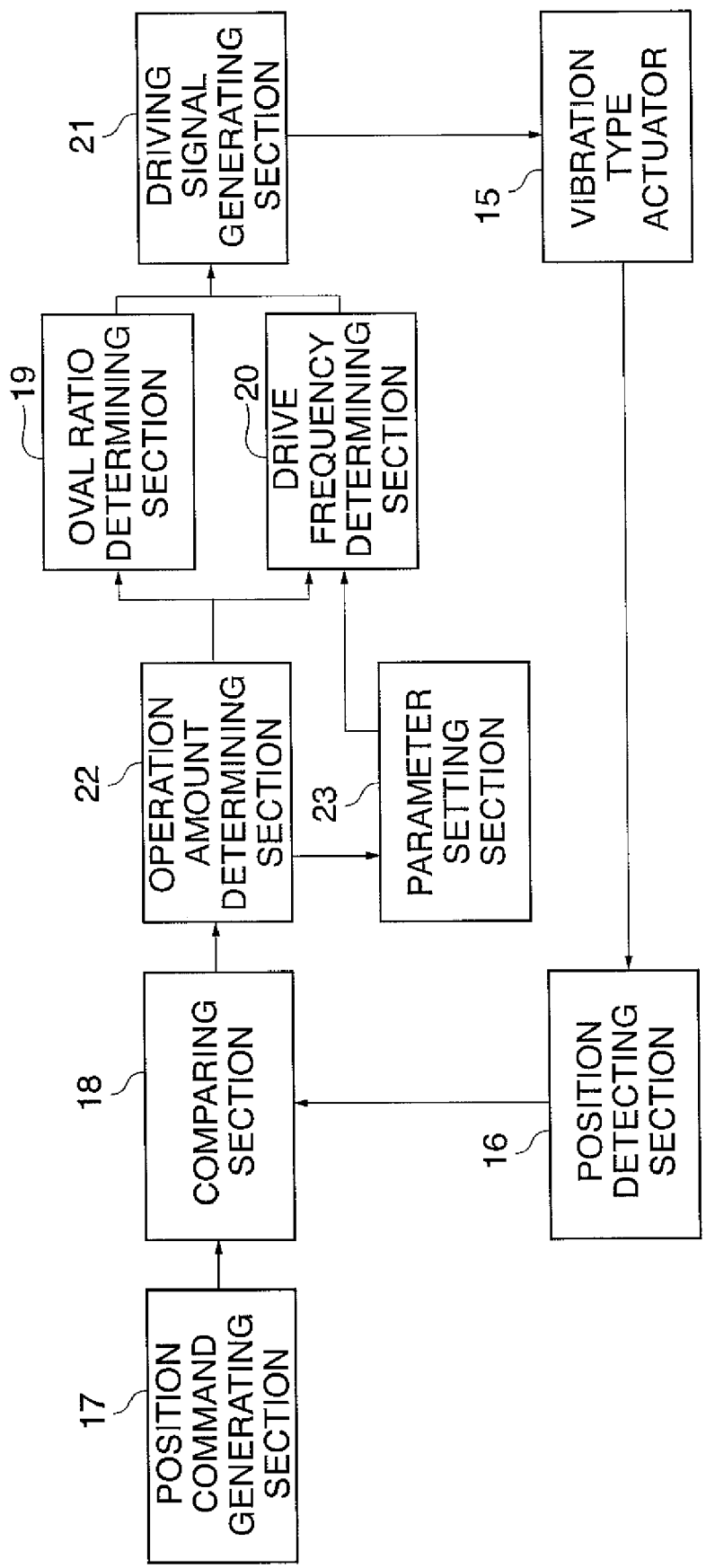
FIG. 7 is a block diagram showing the construction of a control apparatus of a vibration-type actuator according to a third embodiment.

FIG. 7 shows in block diagram the construction of the control apparatus for the vibration-type actuator of the third embodiment of this invention. The control apparatus for the vibration-type actuator of this embodiment corresponds to a combination of the construction shown in FIG. 1 and a parameter setting section 23 added thereto. Except for the parameter setting section 23, the construction is similar to that shown in FIG. 1.

The parameter setting section 23 is supplied with an output from the position detecting section 16 indicating the current position of the driven body and an output from the operation amount determining section 22 indicating the operation amount "e". The parameter setting section 23 outputs a frequency upper limit value to the drive frequency determining section 20 in which the frequency upper limit value is set as a frequency upper limit value used for execution of the phase difference control.

(Functions of the Parameter Setting Section 23)

Next, the functions of the parameter setting section 23 according to this embodiment will be described.

Figure 10:
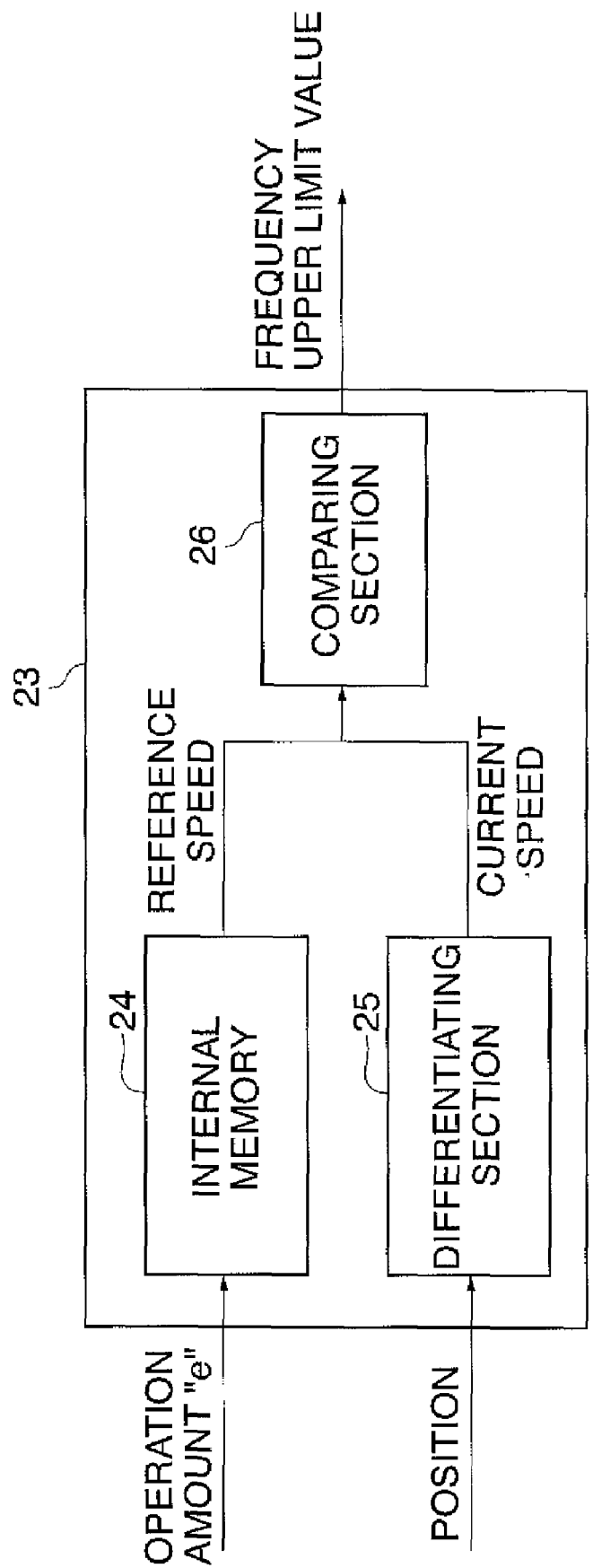
FIG. 10 is a view for explaining the functions of a parameter setting section of a third embodiment.

FIG. 10 is for explaining the functions of the parameter setting section 23 of the third embodiment.

As shown in FIG. 10, the parameter setting section 23 includes an internal memory 24, a differentiating section 25, and a comparing section 26. The internal memory 24 stores in advance a plurality of reference speeds, which are respectively prepared according to operation amounts "e" output from the operation amount determining section 22. The reference speeds may each be an actual driving speed of the vibration-type actuator which is experimentally determined when a corresponding one of the operation amounts "e" is given, or may each be an ideal value of the driving speed of the vibration-type actuator for the given operation amount "e".

The differentiating section 25 calculates an actual driving speed of the driven body by differentiating the output from the position detecting section 16 indicating the current position of the driven body.

The comparing section 26 compares the reference speed output from the internal memory 24 and the actual driving speed of the driven body output from the differentiating section 25, and outputs a frequency upper limit value determined from a result of the comparison to the drive frequency determining section 20.

Figure 8:
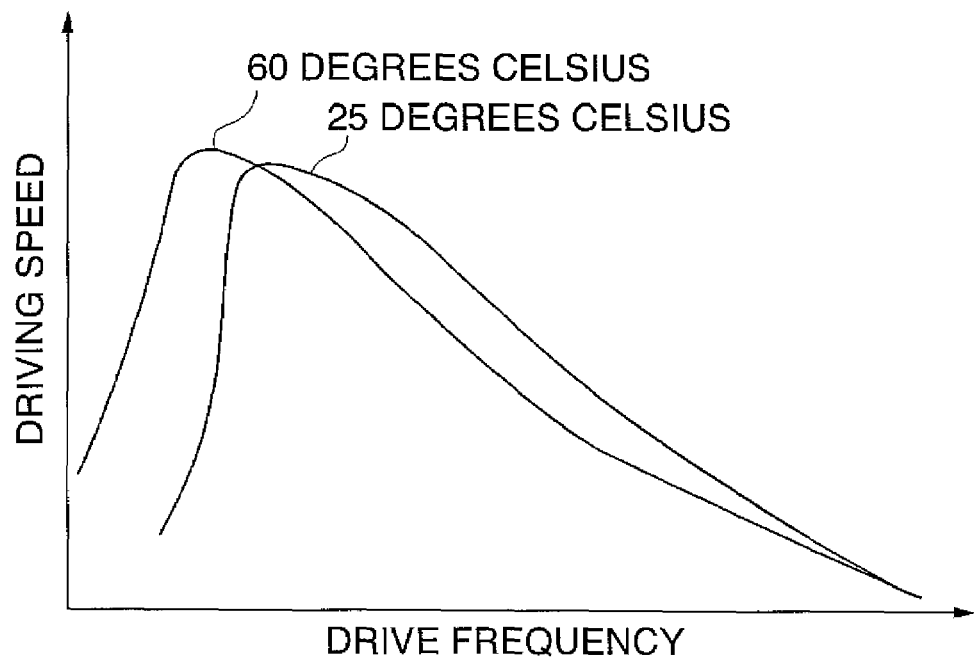
FIG. 8 is a graph showing a relation between drive frequency and driving speed of a vibrator in a vibration-type actuator in respect of each of two environmental temperatures, which is observed when a phase difference between two-phase voltages is set to 90 degrees and a duty ratio of the voltages is set to 50%.
Figure 23:
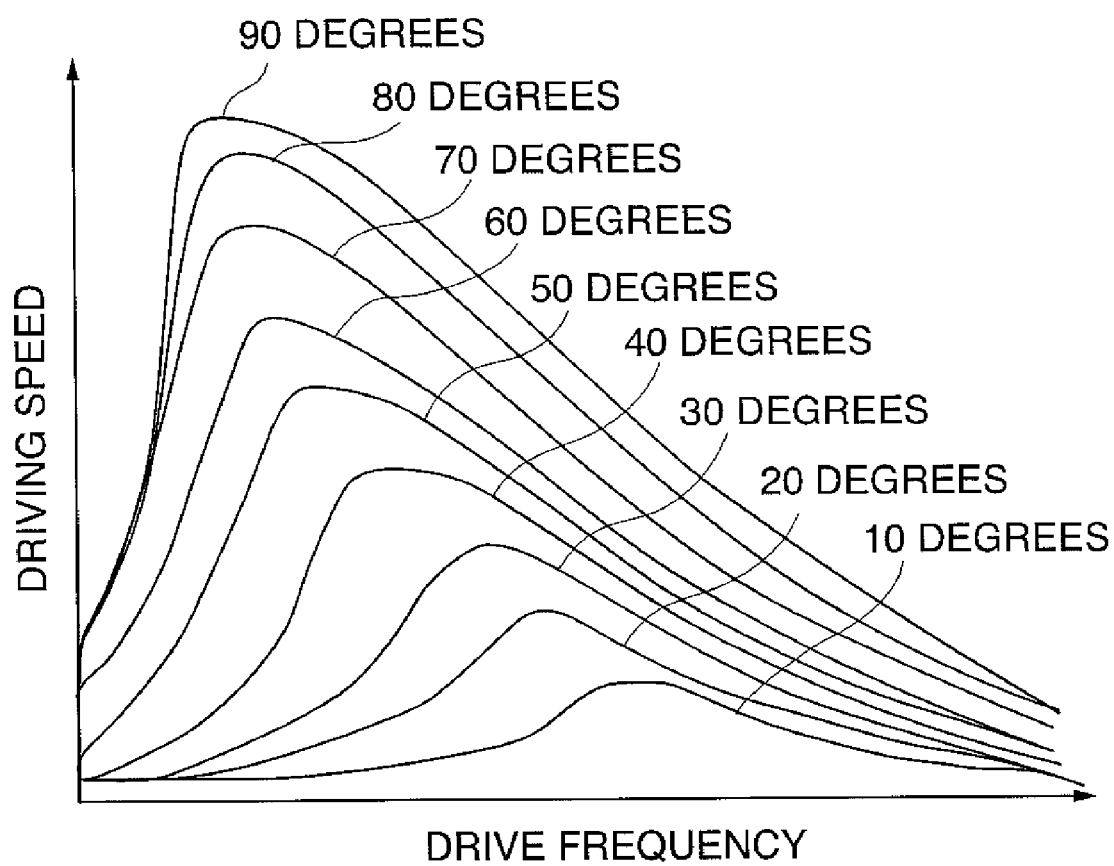
FIG. 23 is a graph showing a relation between drive frequency, driving speed, and phase differences between two-phase voltages applied to the piezoelectric element.
Figure 24:
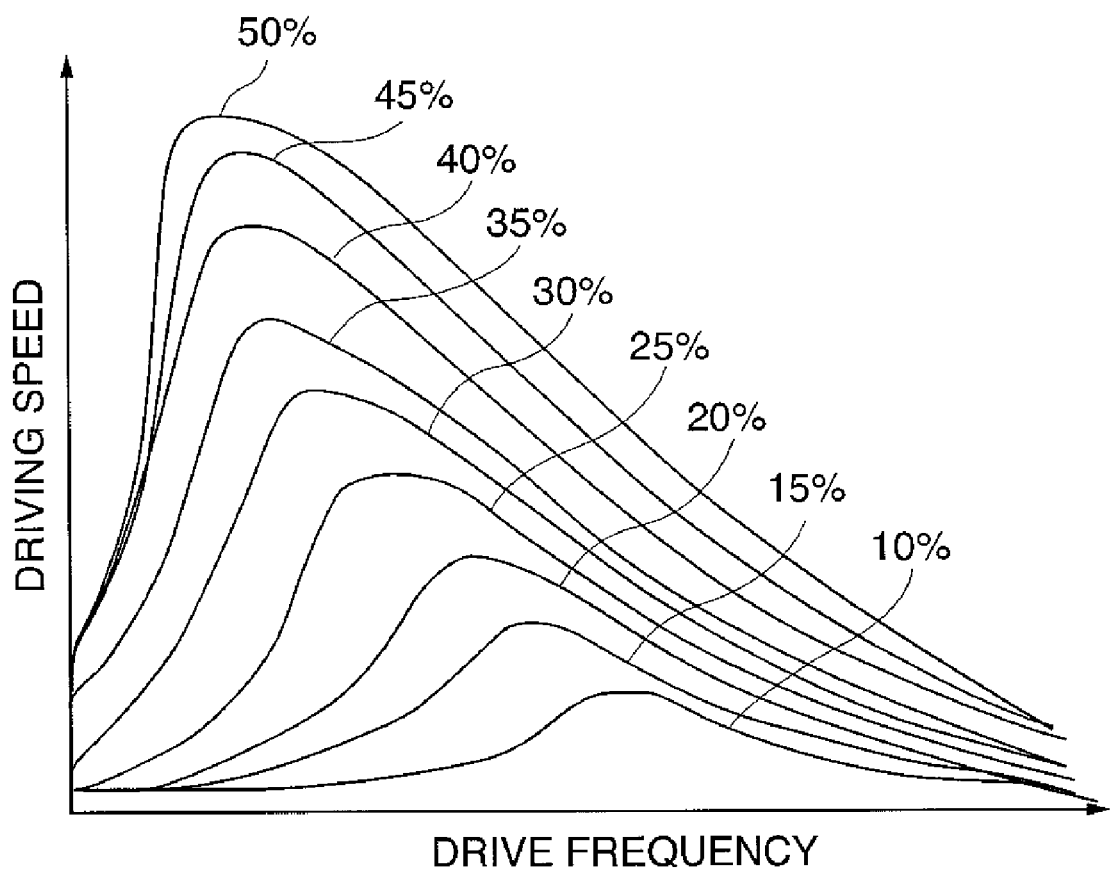
FIG. 24 is a graph showing a relation between drive frequency, driving speed, and duty ratio of AC voltages applied to the piezoelectric element.

FIG. 8 shows in graph a relation between environmental temperature of the piezoelectric element of the vibration-type actuator and a resonance frequency of the vibrator for a case where the phase difference "θ" between two-phase voltages V1, V2 is set to 90 degrees and the duty ratio "ekv" is set to 50%. As understood from FIG. 8, the higher the environmental temperature of the piezoelectric element, the lower the resonance frequency of the vibrator will be. The resonance frequency of the vibrator at the environmental temperature of the piezoelectric element of 60 degrees Celsius becomes lower than that at the environmental temperature of 25 degrees Celsius, also in a case that the phase difference "θ" between the two-phase voltages V1, V2 is set to 10 degrees as shown in FIG. 23.

Figure 9:
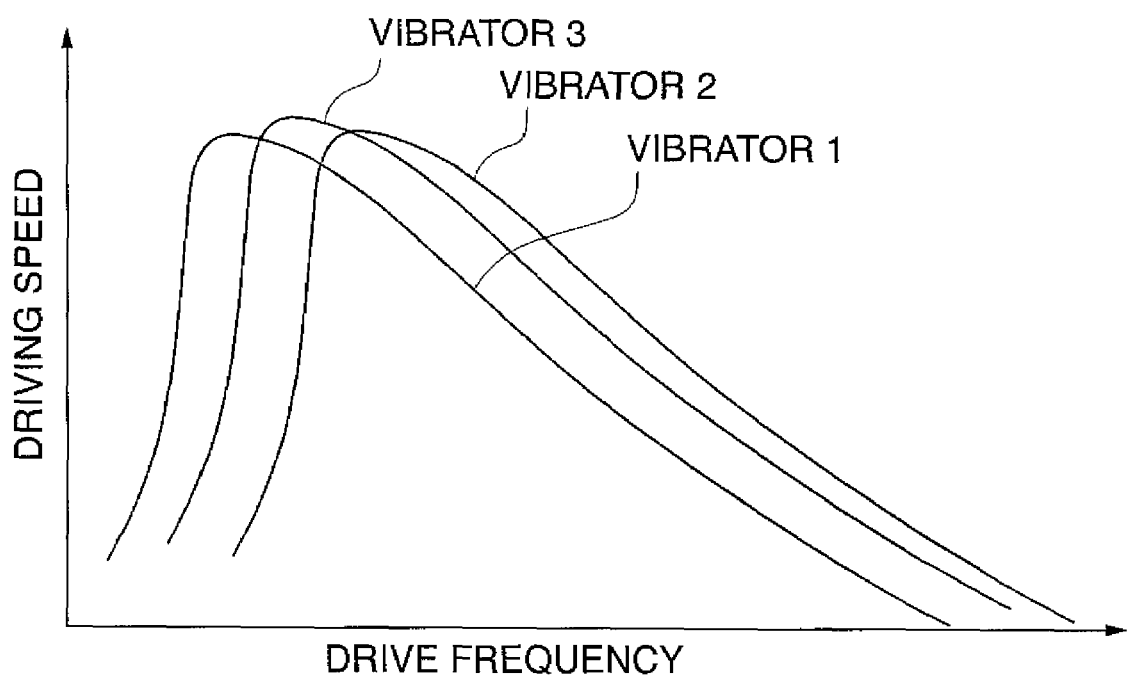
FIG. 9 is a graph showing a relation between drive frequency and driving speed in respect of each of three piezoelectric elements, which is observed when a phase difference between two-phase voltages is set to 90 degrees and a duty ratio of the voltages is set to 50%.

The following is a description of another example. FIG. 9 shows a relation between resonance frequencies of three vibrators ("vibrator 1", "vibrator 2" and "vibrator 3") for a case where the phase difference "θ" between two-phase voltages V1, V2 is set to 90 degrees and the duty ratio "ekv" is set to 50%. As understood from FIG. 9, there is a variation in resonance frequency between these individual vibrators due to fabrication error, etc. In the example shown in FIG. 9, the resonance frequency of "vibrator 1" is lower than those of "vibrator 2" and "vibrator 3", Also in a case that the phase difference "θ" between two-phase voltages V1, V2 is set to 10 degrees as shown in FIG. 23, "vibrator 1" is lower in resonance frequency than "vibrator 2" and "vibrator 3".

If the resonance frequency of the vibrator is shifted to a higher frequency side in this manner due to a change in the environmental temperature of the piezoelectric element and/or individual differences between vibrators, it is necessary to shift the frequency upper limit value toward the higher frequency side in order to prevent the rapid deceleration phenomenon.

However, if the frequency upper limit value is improperly shifted to the higher frequency side, an amount of change in driving force of the vibration-type actuator in response to an amount of change in drive frequency becomes small when the drive frequency "fr" is in the vicinity of the frequency upper limit value. As a result, it becomes difficult to utilize the characteristic of frequency control such that the dynamic range is excellent.

To obviate this, the comparing section 26 compares the reference speed of the driven body read out according to the operation amount "e" with the actual driving speed of the driven body, and in accordance with the difference therebetween, the parameter setting section 23 sets the frequency upper limit value in the drive frequency determining section 20 for use when the phase difference control is executed.

Specifically, as understood from FIGS. 8 and 9, if the actual driving speed is slower than the reference speed, it is possible to estimate that the resonance frequency is shifted to a lower frequency side. Thus, in accordance with the difference between the actual driving speed and the reference speed, the frequency upper limit value is set to a lower value. On the other hand, if the actual driving speed is faster than the reference speed, the frequency upper limit value is set to a higher value in accordance with the difference therebetween.

Figure 11:
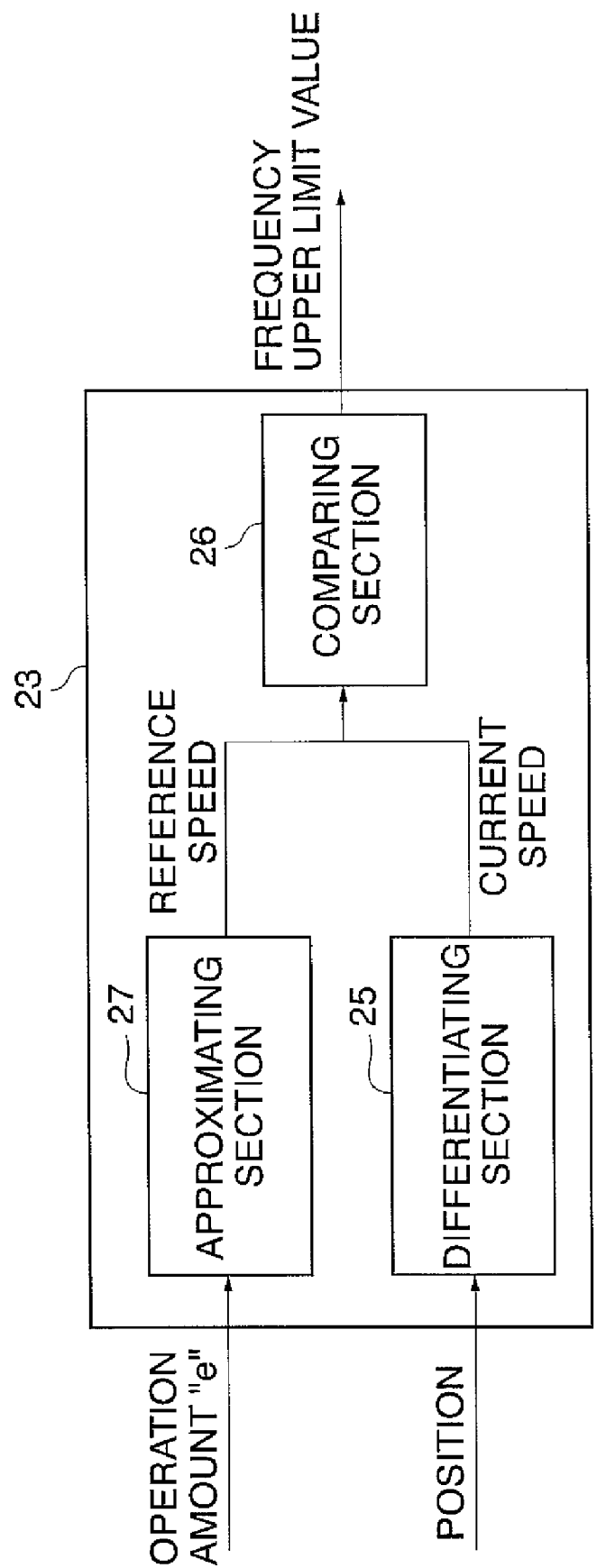
FIG. 11 is another view for explaining the functions of the parameter setting section of the third embodiment.

The parameter setting section 23 may be configured to include, instead of the internal memory 24, an approximating section 27 shown in FIG. 11. The approximating section 27 is adapted to calculate the reference speed by applying the operation amount "e" output from the operation amount determining section 22 to an approximate expression stored in advance.

Figure 12:
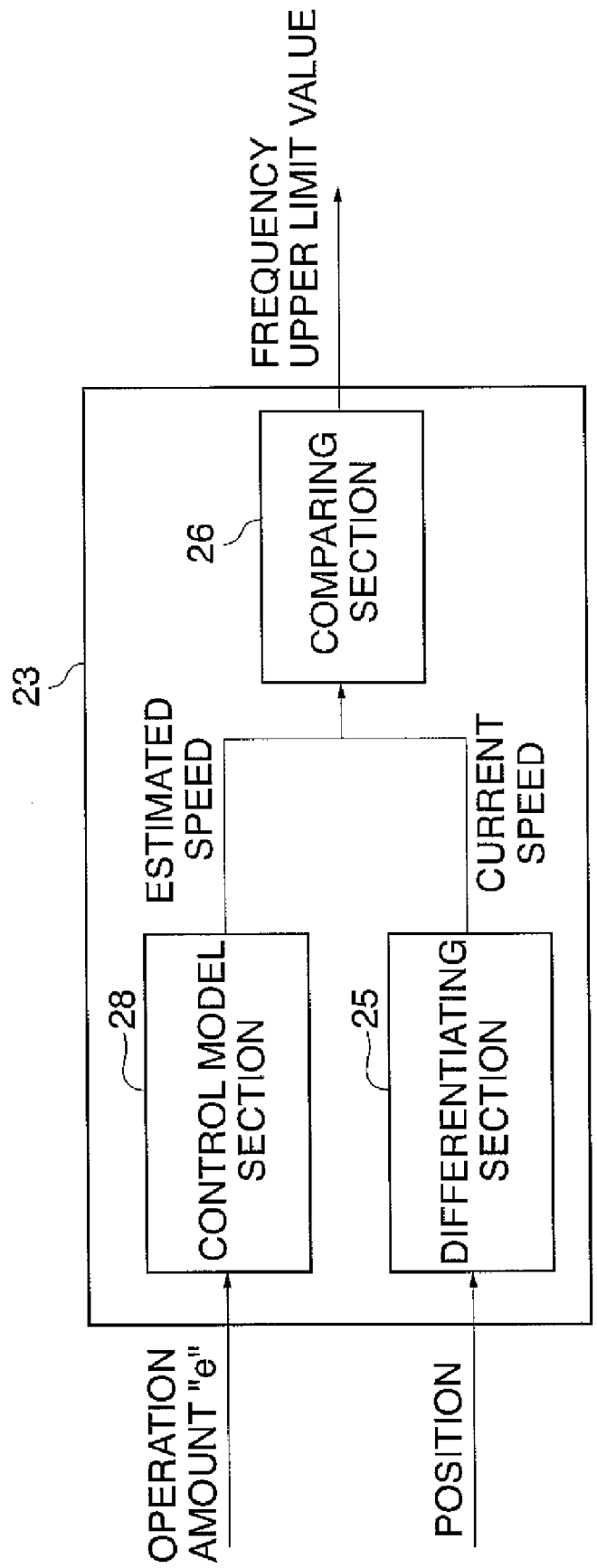
FIG. 12 is still another view for explaining the functions of the parameter setting section of the third embodiment.

Alternatively, the parameter setting section 23 may be configured to include a control model section 28 shown in FIG. 12 instead of the internal memory 24. In the control model section 28, the driving speed of the driven body measured in advance by frequency response measurement or step response measurement is represented by a transfer function or a state equation. The control model section 28 is adapted to calculate the reference speed (estimated speed) by applying the operation amount "e" output from the operation amount determining section 22 to the transfer function or the state equation stored in advance.

In this embodiment, the parameter setting section 23, the oval ratio determining section 19, the drive frequency determining section 20, and the driving signal generating section 21 are implemented by software running on the CPU, and the driving signal generating section 21 is implemented by a function generator, which is mainly comprised of a counter constituted by a logic circuit. The operation amount determining section 22 is implemented by a PI controller or a PID controller.

The construction may be such that the setting change of the frequency upper limit value is not performed by the parameter setting section 23 immediately after start of the vibration-type actuator in which the driving speed of the driven body is unstable. This is because the frequency upper limit value becomes unstable, if the frequency upper limit value is set in accordance with a result of comparison by the comparing section 26 at an initial stage of driving in which a difference between the reference speed and the actual driving speed varies.

(Advantages of the Third Embodiment)

As described above, in this embodiment, the control apparatus supplies driving signals to the vibration-type actuator 15 having the piezoelectric element 5 which is an electromechanical energy conversion element, and changes the voltage of the driving signals so as to control the drive of the vibration-type actuator 15. When the phase difference between the driving signals is changed, the drive frequency "fr" is fixed to a frequency upper limit value, which is set in accordance with the result of comparison between the reference speed of the driven body read out according to the operation amount "e" and the actual driving speed of the driven body.

As a result, it is possible to compensate for a variation in resonance frequency, which is caused by individual differences between vibrators or a characteristic variation due to a change in environmental temperature of the piezoelectric element.

In this embodiment, the case has been described by way of example where the vibration-type actuator is driven by a combination of frequency control and phase difference control, however, this is not limitative. The construction of this embodiment can also be applied to the construction for driving the vibration-type actuator by a combination of frequency control and voltage control as in the second embodiment.

(Modifications)

This invention is not limited to the above described first to third embodiments, but may be modified variously. The followings are examples of modifications.

(1) In FIG. 5, the method has been shown in which the phase difference "θ", the duty ratio "ekv", and the driving frequency "fr" are read out from a memory. Similar results can be obtained by the calculation by a CPU. Instead of the CPU, a logic circuit, a DSP, or the like may of course be used to obtain similar effects.

(2) In the first to third embodiments, the case where the vibration-type actuator for linearly driving the driven body has been described by way of example, but the form of the vibration-type actuator is not limited thereto. For example, the form shown for example in FIG. 13 may be used.

Figure 13:
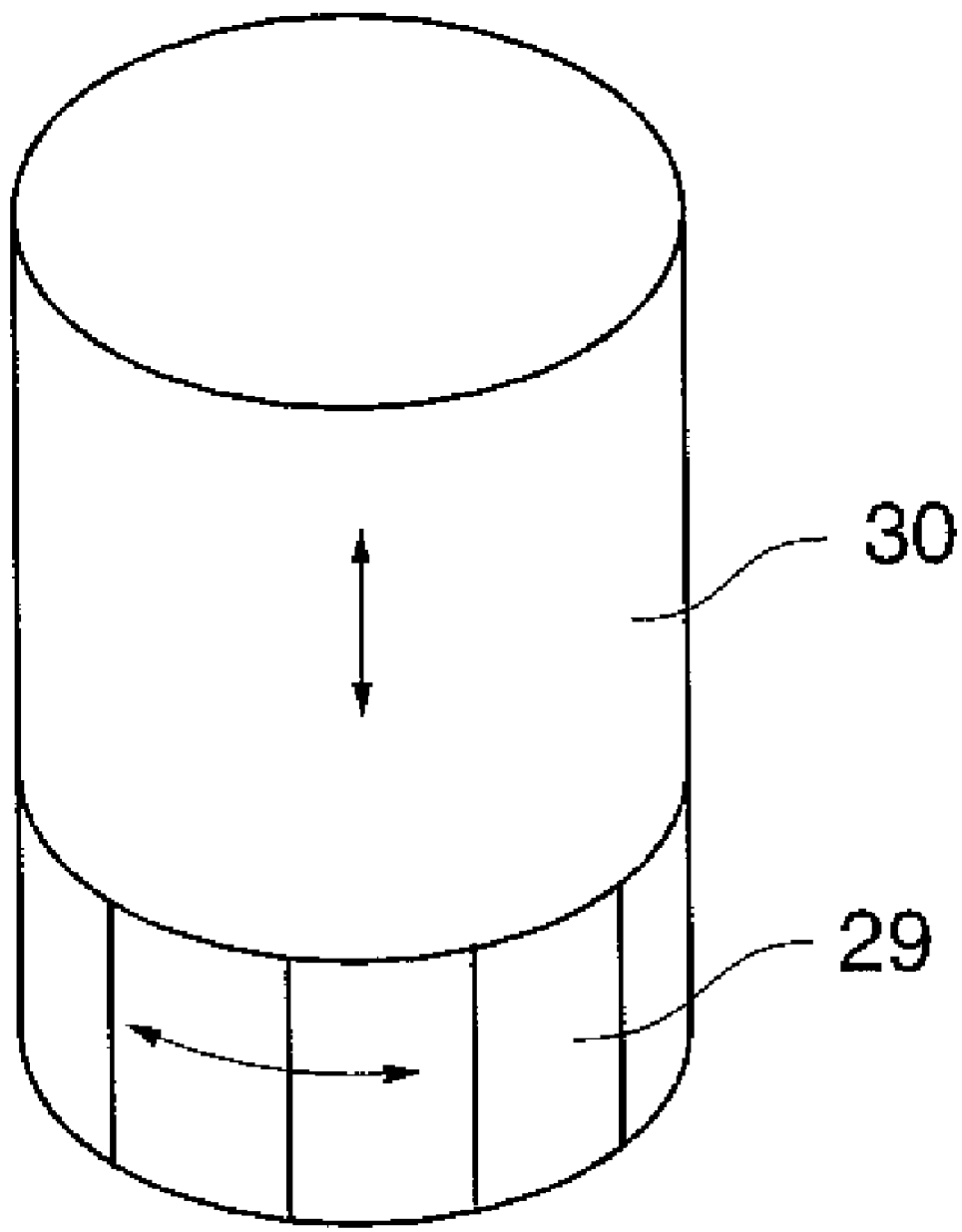
FIG. 13 is a perspective view showing a modification of the vibration-type actuator, which is applicable to the embodiments.

FIG. 13 shows the construction of a modification of the vibration-type actuator (vibration wave driven apparatus) to which the embodiment of this invention is applicable.

This vibration-type actuator includes a cylindrical elastic body, a piezoelectric element 30 adapted for vibration displacement axially of the elastic body, and a piezoelectric element 29 adapted for rotation displacement. The actuator can be configured such that torsional resonance vibration and axial resonance vibration (longitudinal vibration) are simultaneously generated when AC voltages are applied to the piezoelectric elements 29, 30 that function as electro-mechanical energy conversion elements, resulting in an oval motion of an upper end surface (friction surface) of the cylindrical elastic body.

Specifically, as shown in FIG. 13, the piezoelectric element 29 is polarized in the circumferential direction, and circumferential torsional vibration is excited therein when AC voltage is applied. The piezoelectric element 30 is polarized-processed in the thickness direction (axial direction) of the cylindrical elastic body, and longitudinal vibration is excited therein in the axial direction when AC voltage is applied. The application of two-phase AC voltages therefore excites an oval motion of the friction surface of the cylindrical elastic body.

The friction surface is made in pressure contact with a driven body, not shown. The friction surface and the driven body functioning as a clutch can relatively be driven when the AC voltages are applied to the two-phase piezoelectric elements.

In the above construction, the driven body, if made in pressure contact with the friction surface, is adapted to be driven by the oval motion.

Assuming that the axial vibration is caused in a first vibration mode and the torsional vibration is caused in a second vibration mode, a combination of these two vibration modes is able to excite an oval motion of the friction surface. An oval ratio can be determined by changing a relative ratio of amplitudes of vibration in the first and second vibration modes.

As described above, there is a vibration-type actuator configured so as to rotate a rotor by a combination of torsional vibration and axial vibration. Also in such a vibration-type actuator, to change the duty ratio of AC voltages in order to excite the torsional vibration, the drive frequency of AC voltages applied to the piezoelectric elements (the frequency of vibration of the cylindrical elastic body) may be fixed to the frequency upper limit value. This makes it possible to prevent the rapid deceleration phenomenon, even if the resonance frequency of torsional vibration is shifted to a higher frequency side due to the voltage control.

Figure 14B:
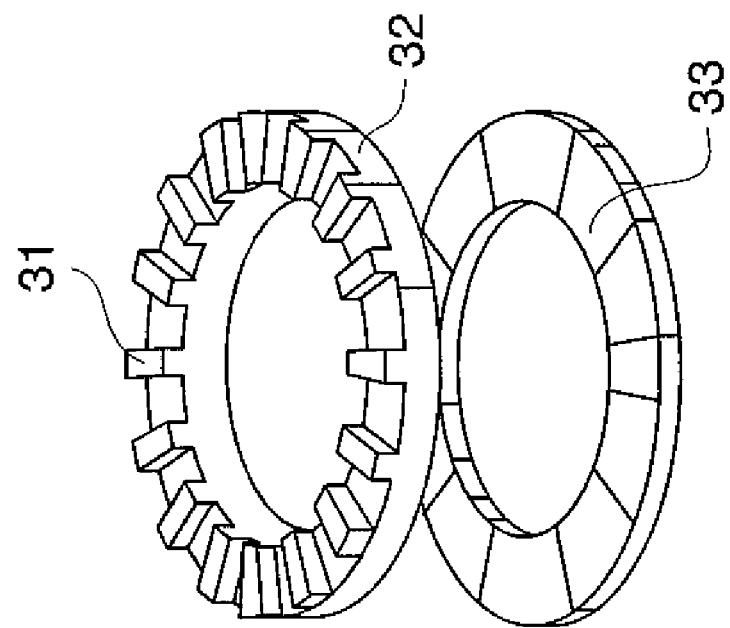
FIGS. 14A and 14B are a side view and a perspective view showing another modification of the vibration-type actuator, which is applicable to the embodiments.
Figure 14A:
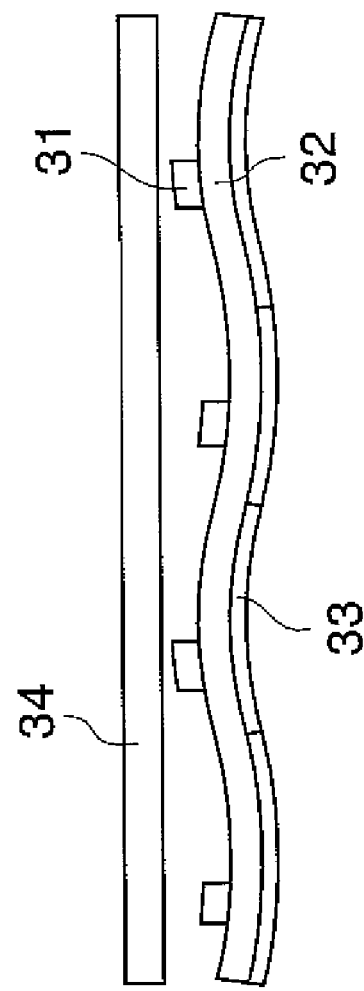

(3) FIGS. 14A and 14B show another modification of the vibration-type actuator to which the embodiment of this invention is applicable.

As shown in FIGS. 14A and 14B, the vibration-type actuator includes an annular ring-like elastic body 32 formed at predetermined circumferential positions with a plurality of protrusions 31, and is adapted to excite a travelling wave in the circumferential direction of the annular ring-like elastic body 32. Each protrusion 31 makes an oval motion when AC voltages are applied to piezoelectric elements 33 functioning as two groups of electro-mechanical energy conversion elements, which are disposed on a rear surface of the elastic body 32.

For ease of description, the annular ring-like elastic body 32 is shown in a rectilinearly developed form in FIG. 14A.

The oval motion of each protrusion 31 on the elastic body 32 is excited by the application of two-phase AC voltages to the two groups of piezoelectric elements 33 which are joined to the elastic body 32. The protrusions 31 are in pressure contact with a driven body 34. The elastic body 32 and the driven body 34 can relatively be driven to each other by applying the AC voltages to the two groups of piezoelectric elements 33.

With this arrangement, the oval ratio of the oval motion excited in the protrusions 31 can be operated by changing the phase difference between the AC voltages applied to the two groups of piezoelectric elements 33. In order to operate the oval ratio, a phase of one of standing waves is changed relative to that of another standing wave. At that time, the drive frequency of the AC voltages applied to the piezoelectric elements 33 may be fixed to the frequency upper limit value. Also in this case, even if the resonance frequency of one of the standing waves is shifted to a high frequency side due to the phase difference control, the rapid deceleration phenomenon can be prevented.

It is to be understood that the object of the present invention may also be accomplished by supplying a system or an apparatus with a storage medium in which a program code of software, which realizes the functions of any of the above described embodiments is stored, and causing a computer (or CPU or MPU) of the system or apparatus to read out and execute the program code stored in the storage medium.

In this case, the program code itself read from the storage medium realizes the functions of any of the above described embodiments, and therefore the program code and the storage medium in which the program code is stored constitute the present invention.

Examples of the storage medium for supplying the program code include a floppy (registered trademark) disk, a hard disk, a magnetic-optical disk, a CD-ROM, a CD-R, a CD-RW, a DVD-ROM, a DVD-RAM, a DVD-RW, a DVD+RW, a magnetic tape, a nonvolatile memory card, and a ROM. Alternatively, the program may be downloaded via a network.

Further, it is to be understood that the functions of any of the above described embodiments may be accomplished not only by executing the program code read out by a computer, but also by causing an OS (operating system) or the like which operates on the computer to perform a part or all of the actual operations based on instructions of the program code.

Further, it is to be understood that the functions of any of the above described embodiments may be accomplished by writing a program code read out from the storage medium into a memory provided on an expansion board inserted into a computer or a memory provided in an expansion unit connected to the computer and then causing a CPU or the like provided in the expansion board or the expansion unit to perform a part or all of the actual operations based on instructions of the program code.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-236502, filed Sep. 12, 2007, and Japanese Patent Application No. 2008-206985, filed Aug. 11, 2008, which are hereby incorporated by reference herein in its entirety.

What is claimed is:

1. A control apparatus for a vibration wave driven apparatus that applies driving signals to a vibrator including an electro-mechanical energy conversion element to thereby produce an oval motion of a driving section of the vibrator by which a driven body made in contact with the driving section is moved, comprising:
    an operation amount determining unit adapted to determine an operation amount of the vibrator;
    a frequency determining unit adapted to determine a frequency of the driving signals based on the operation amount; and
    an oval ratio determining unit adapted to determine an oval ratio of the oval motion by changing a phase difference between the driving signals based on the operation amount,
    wherein said frequency determining unit sets the frequency of the driving signals to a frequency upper limit value when the phase difference between the driving signals is changed by said oval ratio determining unit, and sets the frequency of driving signals to a frequency lower than the frequency upper limit value when the phase difference between the driving signals is not changed by said oval ratio determining unit.

2. The control apparatus according to claim 1, wherein in a case where the operation amount is less than a threshold value, said oval ratio determining unit changes the phase difference between the driving signals in a state where the frequency of the driving signals is fixed to the frequency upper limit value by said frequency determining unit, and in a case where the operation amount is equal to or larger than the threshold value, said frequency determining unit changes the frequency of the driving signals in a frequency band lower than the frequency upper limit value in a state that the phase difference between the driving signals is fixed by said oval ratio determining unit.

3. The control apparatus according to claim 1, wherein said oval ratio determining unit changes the phase difference between the driving signals, thereby changing the oval ratio of the oval motion so as to change an amplitude of the oval motion in a moving direction of the driven body.

4. The control apparatus according to claim 1, further including:
  a detection unit adapted to detect a driving speed of the driven body;
  a unit adapted to determine a reference speed of the driven body in accordance with the operation amount; and
  a changing unit adapted to change the frequency upper limit value in accordance with a result of comparison between the driving speed and the reference speed.

5. A control apparatus for a vibration wave driven apparatus that applies driving signals to a vibrator including an electro-mechanical energy conversion element to thereby produce an oval motion of a driving section of the vibrator by which a driven body made in contact with the driving section is moved, comprising:
  an operation amount determining unit adapted to determine an operation amount of the vibrator;
  a frequency determining unit adapted to determine a frequency of the driving signals based on the operation amount; and
  an oval ratio determining unit adapted to determine an oval ratio of the oval motion by changing a voltage of the driving signals based on the operation amount,
  wherein said frequency determining unit sets the frequency of the driving signals to a frequency upper limit value when the voltage of the driving signals is changed by said oval ratio determining unit, and sets the frequency of the driving signals to a frequency lower than the frequency upper limit value when the voltage of the driving signals is not changed by said oval ratio determining unit.

6. The control apparatus according to claim 5, wherein in a case where the operation amount is less than a threshold value, said oval ratio determining unit changes the voltage of the driving signals in a state where the frequency of the driving signals is fixed to the frequency upper limit value by said frequency determining unit, and
  in a case where the operation amount is equal to or larger than the threshold value, said frequency determining unit changes the frequency of the driving signals in a frequency band lower than the frequency upper limit value in a state that the voltage of the driving signals is fixed by said oval ratio determining unit.

7. The control apparatus according to claim 5, wherein said oval ratio determining unit changes the voltage of the driving signals, thereby changing the oval ratio of the oval motion so as to change an amplitude of the oval motion in a moving direction of the driven body.

8. The control apparatus according to claim 5, further including:
  a detection unit adapted to detect a driving speed of the driven body;
  a unit adapted to determine a reference speed of the driven body in accordance with the operation amount; and
  a changing unit adapted to change the frequency upper limit value in accordance with a result of comparison between the driving speed and the reference speed.

9. A control method for a vibration wave driven apparatus that applies driving signals to a vibrator including an electro-mechanical energy conversion element to thereby produce an oval motion of a driving section of the vibrator by which a driven body made in contact with the driving section is moved, comprising:
  an operation amount determining step of determining an operation amount of the vibrator;
  a frequency determining step of determining a frequency of the driving signals based on the operation amount determined in said operation amount determining step; and
  an oval ratio determining step of determining an oval ratio of the oval motion by changing a phase difference between the driving signals based on the operation amount determined in said operation amount determining step,
  wherein the frequency of the driving signals is set to a frequency upper limit value in said frequency determining step when the phase difference between the driving signals is changed in said oval ratio determining step, and the frequency of driving signals is set to a frequency lower than the frequency upper limit value when the phase difference between the driving signals is not changed in said oval ratio determining step.

10. A control method for a vibration wave driven apparatus that applies driving signals to a vibrator including an electro-mechanical energy conversion element to thereby produce an oval motion of a driving section of the vibrator by which a driven body made in contact with the driving section is moved, comprising:
  an operation amount determining step of determining an operation amount of the vibrator;
  a frequency determining step of determining a frequency of the driving signals based on the operation amount determined in said operation amount determining step; and
  an oval ratio determining step of determining an oval ratio of the oval motion by changing a voltage of the driving signals based on the operation amount determined in said operation amount determining step,
  wherein the frequency of the driving signals is set to a frequency upper limit value in said frequency determining step when the voltage of the driving signals is changed in said oval ratio determining step, and the frequency of the driving signal is set to a frequency lower than the frequency upper limit value in said frequency determining step when the voltage of the driving signals is not changed in said oval ratio determining step.

* * * * *